US012776253B2

(12) United States Patent
Kim et al.

(10) Patent No.: US 12,776,253 B2
(45) Date of Patent: Oct. 27, 2026

(54) DISPLAY DEVICE AND METHOD OF DRIVING THE SAME, AND ELECTRONIC DEVICE FOR PROVIDING IMAGE

(71) Applicant: Samsung Display Co., LTD., Yongin-si (KR)

(72) Inventors: Sung Hwan Kim, Yongin-si (KR); Min Chul Shin, Yongin-si (KR); Ji Youn Seo, Yongin-si (KR); Myeong Eon Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/952,837

(22) Filed: Nov. 19, 2024

(65) Prior Publication Data

US 2025/0316212 A1 Oct. 9, 2025

(30) Foreign Application Priority Data

Apr. 9, 2024 (KR) ........................ 10-2024-0048234

(51) Int. Cl.

*G09G 3/32* (2016.01)
*G09G 3/3266* (2016.01)
*G09G 3/3291* (2016.01)

(52) U.S. Cl.

CPC ............. *G09G 3/32* (2013.01); *G09G 3/3266* (2013.01); *G09G 3/3291* (2013.01); *G09G 2310/0267* (2013.01); *G09G 2310/0275* (2013.01); *G09G 2320/0233* (2013.01)

(58) Field of Classification Search

None
See application file for complete search history.

(56) References Cited

U.S. PATENT DOCUMENTS

| | | | | |
|---|---|---|---|---|
| 10,713,996 | B2 | 7/2020 | Kim et al. | |
| 2006/0139257 | A1* | 6/2006 | Kwak | G09G 3/3233 345/76 |
| 2022/0157230 | A1* | 5/2022 | Suzuki | G09G 3/32 |
| 2023/0005423 | A1* | 1/2023 | Lu | G09G 3/3233 |

FOREIGN PATENT DOCUMENTS

| | | | |
|---|---|---|---|
| CN | 102316648 | A | 1/2012 |
| CN | 104318903 | A | 1/2015 |
| CN | 114283704 | A | 4/2022 |
| KR | 10-2538484 | B1 | 6/2023 |

* cited by examiner

*Primary Examiner* — Christopher J Kohlman
(74) *Attorney, Agent, or Firm* — Womble Bond Dickinson (US) LLP

(57) ABSTRACT

A display device includes a pixel that includes a first subpixel, a second subpixel, and a third subpixel respectively configured to emit light in response to a first driving current, a second driving current, and a third driving current during different first, second, and third emission periods.

17 Claims, 24 Drawing Sheets

DISPLAY DEVICE AND METHOD OF DRIVING THE SAME, AND ELECTRONIC DEVICE FOR PROVIDING IMAGE

CROSS-REFERENCE TO RELATED APPLICATION

The present application claims priority to, and the benefit of, Korean Patent Application No. 10-2024-0048234, filed on Apr. 9, 2024, in the Korean Intellectual Property Office, the entire disclosure of which is incorporated herein by reference.

BACKGROUND

1. Field

The present disclosure relates to a display device and a method of driving the same, and an electronic device for providing an image.

2. Description of the Related Art

As the information society develops, demands for display devices for displaying images are increasing in various forms. Accordingly, various types of display devices including display devices are being developed. A light-emitting display device includes pixels including light-emitting elements.

SUMMARY

Aspects of the present disclosure provide a display device that can prevent or reduce a decrease in luminance of a pixel and a method of driving the display device, and an electronic device for providing an image.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an aspect of the present disclosure, there is provided a display device including a pixel that includes a first subpixel, a second subpixel, and a third subpixel respectively configured to emit light in response to a first driving current, a second driving current, and a third driving current during different first, second, and third emission periods.

The first emission period, the second emission period, and the third emission period might not temporally overlap.

The first emission period, the second emission period, and the third emission period may be temporally separated with respective blank periods therebetween.

The first emission period, the second emission period, and the third emission period may partially overlap.

Respective start times of the first emission period, the second emission period, and the third emission period may be different.

Respective end times of the first emission period, the second emission period, and the third emission period may be different.

On-duty ratios of the first subpixel, the second subpixel, and the third subpixel may be substantially equal.

An on-duty ratio of the first subpixel, the second subpixel, and the third subpixel may be about ⅓ of an on-duty ratio of the pixel.

The display device may further include a first emission control line connected to the first subpixel, a second emission control line connected to the second subpixel, and a third emission control line connected to the third subpixel.

The display device may further include a scan driver connected to the pixel, and including an emission control signal output unit configured to output a first emission control signal, a second emission control signal, and a third emission control signal to the first emission control line, the second emission control line, and the third emission control line, respectively.

The emission control signal output unit may be configured to sequentially output the first emission control signal, the second emission control signal, and the third emission control signal during one driving cycle of the pixel.

The display device may further include at least one scan line connected to the first subpixel, the second subpixel, and the third subpixel, wherein the scan driver further includes at least one scan signal output unit configured to output a scan signal to the at least one scan line.

The first subpixel, the second subpixel, and the third subpixel may be on a same horizontal line in a display area where the pixel is located, wherein the first emission control line, the second emission control line, and the third emission control line are separated on the horizontal line.

The display device may further include a first data line connected to the first subpixel, a second data line connected to the second subpixel, a third data line connected to the third subpixel, and a data driver configured to output a first data voltage, a second data voltage, and a third data voltage to the first data line, the second data line, and the third data line, respectively.

The first driving current, the second driving current, and the third driving current may respectively have magnitudes corresponding to the first data voltage, the second data voltage, and the third data voltage.

The first subpixel may include at least one light-emitting element for receiving the first driving current during the first emission period, wherein the second subpixel includes at least one light-emitting element for receiving the second driving current during the second emission period, and wherein the third subpixel includes at least one light-emitting element for receiving the third driving current during the third emission period.

According to an aspect of the present disclosure, there is provided a method of driving a display device that includes a pixel including subpixels, the method including supplying data voltages respectively to the subpixels in response to video data, and driving the subpixels in different emission periods.

The subpixels may include a first subpixel, a second subpixel, and a third subpixel, wherein the driving of the subpixels in different emission periods includes supplying a first emission control signal to the first subpixel during a first emission period, supplying a second emission control signal to the second subpixel during a second emission period, and supplying a third emission control signal to the third subpixel during a third emission period.

The first emission period, the second emission period, and the third emission period might not temporally overlap.

The first emission period, the second emission period, and the third emission period may partially temporally overlap, wherein respective start times of the first emission period, the second emission period, and the third emission period are different, and wherein respective end times of the first emission period, the second emission period, and the third emission period are different.

According to an aspect of the present disclosure, there is provided an electronic device for providing an image, including a display device, the display device including a pixel that includes a first subpixel, a second subpixel, and a third subpixel respectively configured to emit light in response to a first driving current, a second driving current, and a third driving current during different first, second, and third emission periods.

According to a display device and a method of driving the same, according to various embodiments, emission periods of subpixels included in a pixel may be set differently. Accordingly, a change or decrease in luminance of the pixel due to signal interference, etc. can be prevented or improved.

However, aspects of the embodiments of the present disclosure are not limited to those exemplified above, and various other aspects are incorporated herein.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
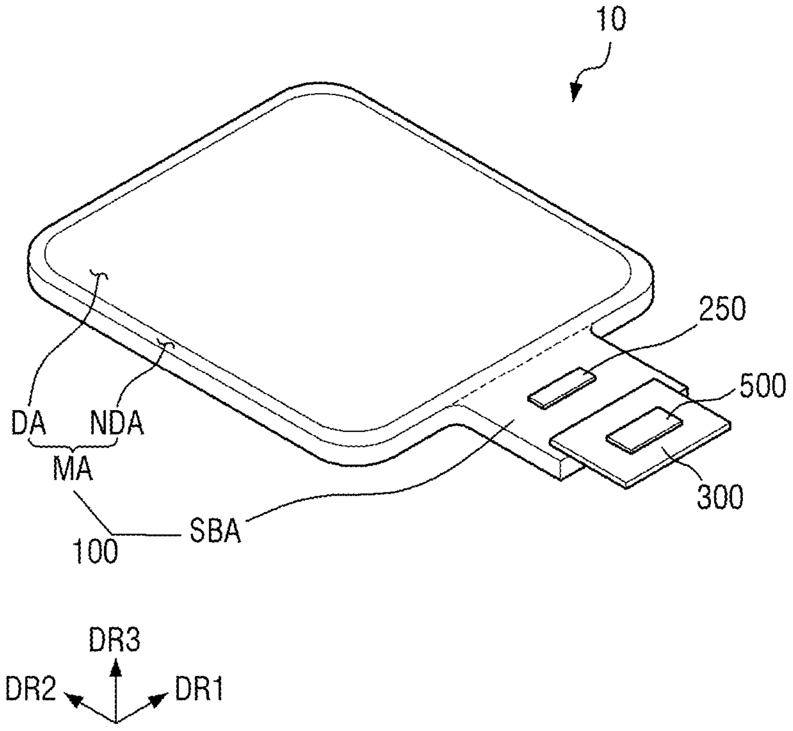
FIG. 1 is a perspective view of a display device according to one or more embodiments.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing an embodiment corresponds to one or more embodiments of the present disclosure.

A person of ordinary skill in the art would appreciate, in view of the present disclosure in its entirety, that each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner unless otherwise stated or implied.

In the drawings, the relative sizes of elements, layers, and regions may be exaggerated for clarity and/or descriptive purposes. In other words, because the sizes and thicknesses of elements in the drawings are arbitrarily illustrated for convenience of description, the disclosure is not limited thereto. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result of, for example, manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the illustrated shapes of elements, layers, or regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place.

Spatially relative terms, such as "beneath," "below," "lower," "lower side," "under," "above," "upper," "over," "higher," "upper side," "side" (e.g., as in "sidewall"), and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below," "beneath," "or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, the phrase "in a plan view" means when an object portion is viewed from above, and the phrase "in a schematic cross-sectional view" means when a schematic cross-section taken by vertically cutting an object portion is viewed from the side. The terms "overlap" or "overlapped" mean that a first object may be above or below or to a side of a second object, and vice versa. Additionally, the term "overlap" may include stack, face or facing, extending over, covering, or partly covering or any other suitable term as would be appreciated and understood by those of ordinary skill in the art. The expression "not overlap" may include meaning, such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

It will be understood that when an element, layer, region, or component is referred to as being "formed on," "on," "connected to," or "(operatively or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a resistor, a capacitor, and/or the like. In describing embodiments, an expression of connection indicates electrical connection unless explicitly described to be direct connection, and "directly connected/directly coupled," or "directly on," refers to one component directly connecting or coupling another component, or being on another component, without an intermediate component.

In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components, such as "between," "immediately between" or "adjacent to" and "directly adjacent to," may be construed similarly. It will be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions such as "at least one of," "a plurality of," "one of," and other prepositional phrases, when preceding a list of elements, modify the entire list of elements and do not modify the individual elements of the list. When "C to D" is stated, it means C or more and D or less, unless otherwise specified.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are used only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

When one or more embodiments may be implemented differently, a specific process order may be performed differently from the described order. For example, two consecutively described processes may be performed substantially at the same time or performed in an order opposite to the described order.

As used herein, the terms "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

In some embodiments well-known structures and devices may be described in the accompanying drawings in relation to one or more functional blocks (e.g., block diagrams), units, and/or modules to avoid unnecessarily obscuring various embodiments. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a perspective view of a display device 10 according to one or more embodiments.

Referring to FIG. 1, the display device 10 is a device for displaying moving images or still images. The display device 10 may be used as a display screen in portable electronic devices, such as mobile phones, smartphones, tablet personal computers (PCs), smart watches, watch phones, mobile communication terminals, electronic notebooks, electronic books, portable multimedia players (PMPs), navigation devices and ultra-mobile PCs (UMPCs), as well as in various products, such as televisions, notebook computers, monitors, billboards, and Internet of things (IoT) devices.

The display device 10 may be a light-emitting display device, such as an organic light-emitting display device using an organic light-emitting diode, a quantum dot light-emitting display device including a quantum dot light-emitting layer, an inorganic light-emitting display device including an inorganic semiconductor, or a micro- or nano-light-emitting display device using a micro- or nano-light-emitting diode (LED). A case where the display device 10 is a micro- or nano-light-emitting display device will be mainly described below, but the present disclosure is not limited thereto. For ease of description, a micro- or nano-LED will be referred to as a light-emitting element.

The display device 10 includes a display panel 100, a display driver 250, a circuit board 300, and a power supply unit 500.

The display panel 100 may be shaped like a rectangular plane having short sides in a first direction DR1, and long sides in a second direction DR2 crossing the first direction DR1. Each corner where a short side extending in the first direction DR1 meets a long side extending in the second direction DR2 may be rounded to have a curvature (e.g., predetermined curvature) or may be right-angled. The planar shape of the display panel 100 is not limited to a quadrangular shape, but may also be other polygonal shapes, a circular shape, or an elliptical shape. The display panel 100 may be formed flat, but embodiments are not limited thereto. For example, the display panel 100 may include a curved portion formed at left and right ends, and having a constant or varying curvature. In addition, the display panel 100 may be formed to be flexible so that it can be curved, bent, folded, or rolled.

The display panel 100 may include a main area MA and a sub-area SBA.

The main area MA may include a display area DA, which displays an image, and a non-display area NDA located around the display area DA. The display area DA may include a plurality of pixels, which display an image. Each of the pixels may include a plurality of subpixels. For example, each of the pixels may include a first subpixel that emits first light, a second subpixel that emits second light, and a third subpixel that emits third light, but embodiments of the present specification are not limited thereto.

The sub-area SBA may protrude from a side of the main area MA in the second direction DR2. Although the sub-area SBA is unfolded in FIG. 1, it may be bent. In this case, the sub-area SBA may be placed on a lower surface of the display panel 100. When the sub-area SBA is bent, it may be overlapped by the main area MA in a third direction DR3, which is a thickness direction of the display panel 100. The display driver 250 may be located in the sub-area SBA.

The display driver 250 may generate signals and voltages for driving the display panel 100. The display driver 250 may be formed as an integrated circuit and attached onto the display panel 100 using a chip-on-glass (COG) method, a chip-on-plastic (COP) method, or an ultrasonic-bonding method. However, embodiments are not limited thereto. For example, the display driver 250 may also be attached onto the circuit board 300 using a chip-on-film (COF) method.

The circuit board 300 may be attached to an end of the sub-area SBA of the display panel 100. Accordingly, the circuit board 300 may be electrically connected to the display panel 100 and the display driver 250. The display panel 100 and the display driver 250 may receive digital video data, timing signals, and driving voltages through the circuit board 300. The circuit board 300 may be a flexible printed circuit board, a printed circuit board, or a flexible film, such as a chip on film.

The power supply unit 500 may generate a plurality of panel driving voltages according to a power supply voltage from the outside. The power supply unit 500 may be formed as an integrated circuit and attached onto the circuit board 300 using a COF method.

Figure 2:
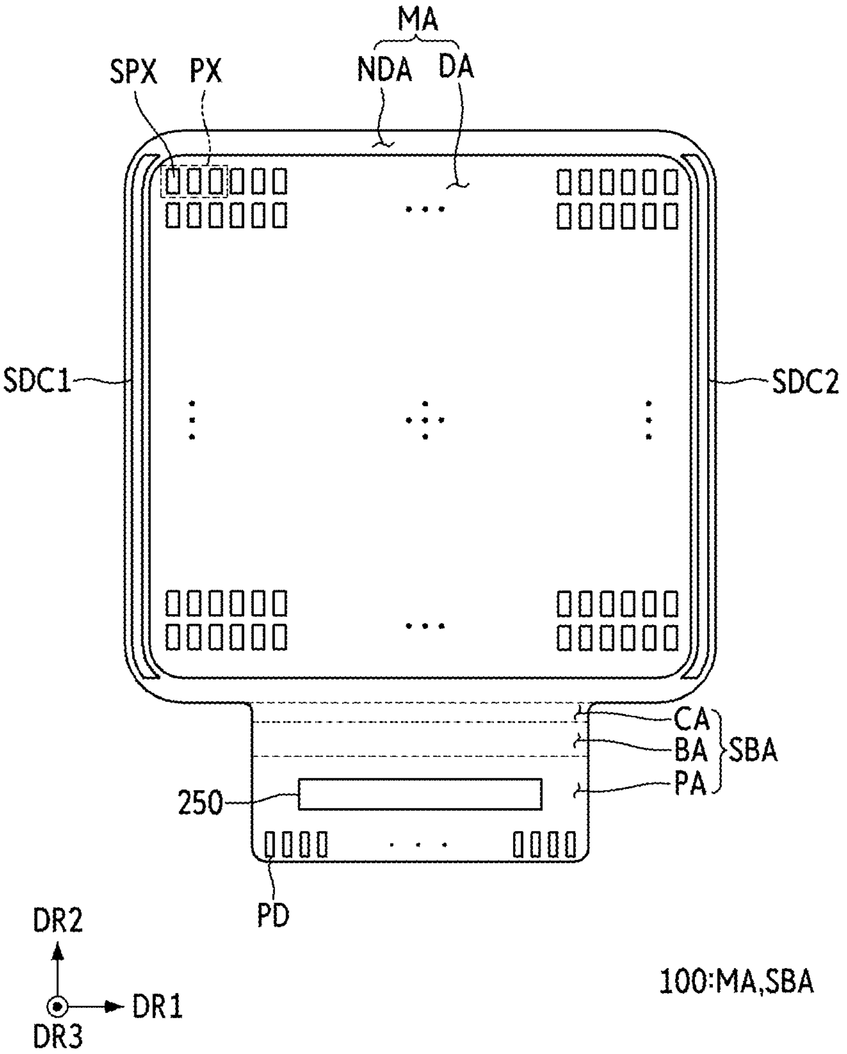
FIG. 2 is a layout view of the display device according to one or more embodiments.

FIG. 2 is a layout view of the display device 10 according to one or more embodiments. FIG. 2 illustrates a state in which the sub-area SBA is unfolded.

Referring to FIG. 2, the display panel 100 may include the main area MA and the sub-area SBA.

The main area MA may include the display area DA, which displays an image, and the non-display area NDA located around the display area DA. The display area DA may occupy most of the main area MA. The display area DA may be located in the center of the main area MA.

The display area DA may include a plurality of pixels PX for displaying an image, and each of the pixels PX may include a plurality of subpixels SPX. A pixel PX may be defined as a smallest subpixel group that can express a white gray level.

The non-display area NDA may neighbor the display area DA. The non-display area NDA may be an area outside the display area DA. The non-display area NDA may surround the display area DA. The non-display area NDA may be an edge area of the display panel 100.

A first scan driver SDC1 and a second scan driver SDC2 may be located in the non-display area NDA. The first scan driver SDC1 may be located on a side (e.g., a left side) of the display panel 100, and the second scan driver SDC2 may be located on the other side (e.g., a right side) of the display panel 100. However, embodiments are not limited thereto. Each of the first scan driver SDC1 and the second scan driver SDC2 may be electrically connected to the display driver 250 through scan fan-out lines. Each of the first scan driver SDC1 and the second scan driver SDC2 may receive a scan-timing control signal from the display driver 250, may generate scan signals according to the scan-timing control signal, and may output the scan signals to scan lines.

The sub-area SBA may protrude from a side of the main area MA in the second direction DR2. A length of the sub-area SBA in the second direction DR2 may be less than a length of the main area MA in the second direction DR2. A length of the sub-area SBA in the first direction DR1 may be less than a length of the main area MA in the first direction DR1 or may be substantially equal to the length of the main area MA in the first direction DR1. The sub-area SBA may be bent and placed under the display panel 100. In this case, the sub-area SBA may be overlapped by the main area MA in the third direction DR3.

The sub-area SBA may include a connection area CA, a pad area PA, and a bending area BA.

The connection area CA is an area protruding from a side of the main area MA in the second direction DR2. A side of the connection area CA may contact the non-display area NDA of the main area MA, and the other side of the connection area CA may contact the bending area BA.

The pad area PA is an area where pads PD and the display driver 250 are located. The display driver 250 may be attached to driving pads of the pad area PA using a conductive adhesive member, such as an anisotropic conductive film. The circuit board 300 may be attached to the pads PD of the pad area PA using a conductive adhesive member, such as an anisotropic conductive film. A side of the pad area PA may contact the bending area BA.

The bending area BA is a bendable area. When the bending area BA is bent, the pad area PA may be placed under the connection area CA and the main area MA. The bending area BA may be located between the connection area CA and the pad area PA. A side of the bending area BA may contact the connection area CA, and the other side of the bending area BA may contact the pad area PA.

Figure 3:
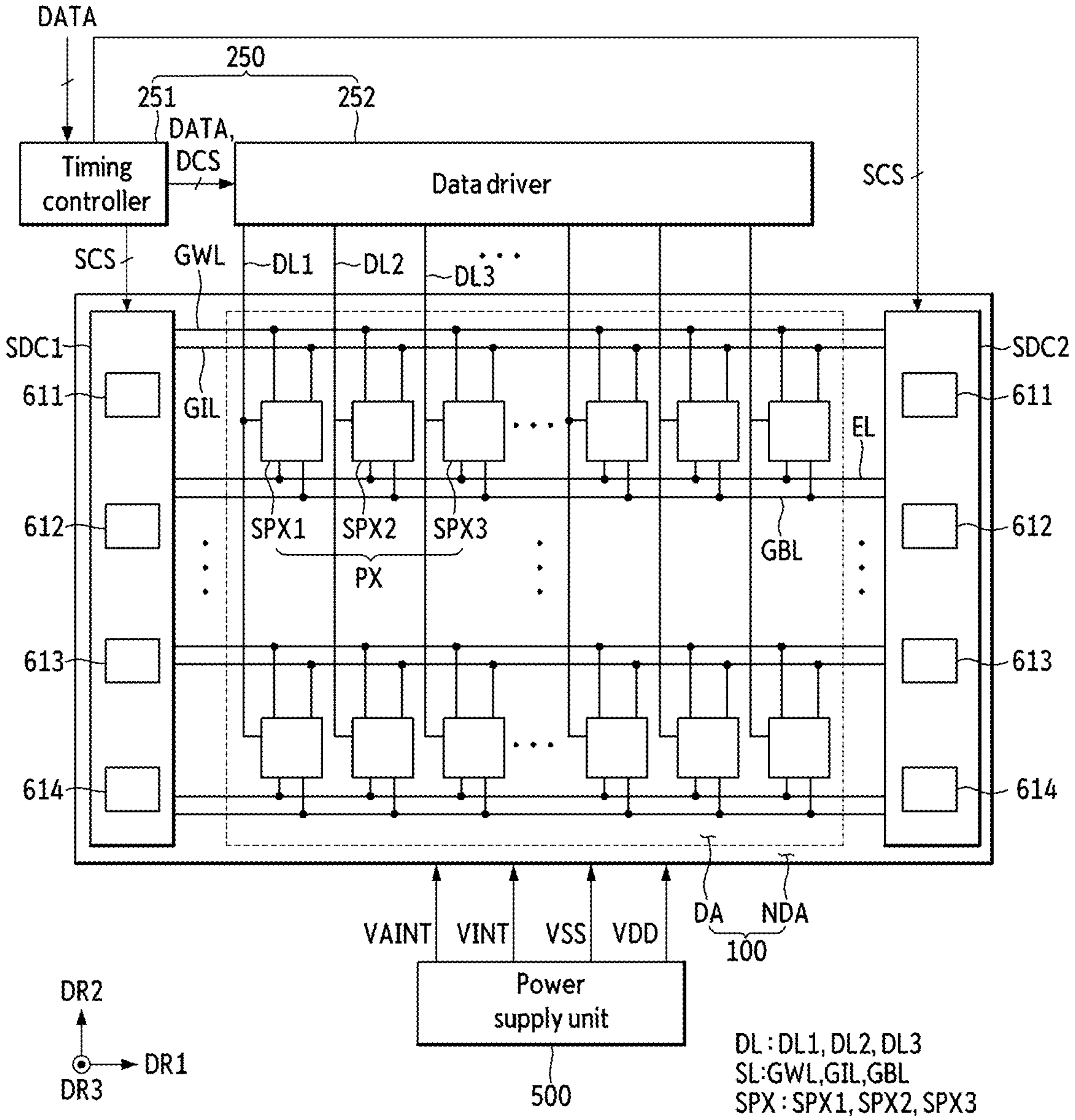
FIG. 3 is a block diagram of the display device according to one or more embodiments.

FIG. 3 is a block diagram of the display device 10 according to one or more embodiments.

Referring to FIG. 3, the display area DA includes a plurality of pixels PX, a plurality of scan lines SL, a plurality of emission control lines EL, and a plurality of data lines DL.

The pixels PX may be arranged in a matrix form in the first direction DR1 and the second direction DR2. The scan lines SL and the emission control lines EL may extend in the first direction DR1, and may be arranged in the second direction DR2. The data lines DL may extend in the second direction DR2, and may be arranged in the first direction DR1. The scan lines SL include a plurality of write scan lines GWL, a plurality of initialization scan lines GIL, and a plurality of bias scan lines GBL.

Each of the pixels PX may include a plurality of subpixels SPX. For example, each of the pixels PX may include a first subpixel SPX1, a second subpixel SPX2, and a third subpixel SPX3.

Each of the subpixels SPX may be connected to at least one scan line SL. For example, each of the subpixels SPX may be connected to any one of the write scan lines GWL, any one of the initialization scan lines GIL, any one of the bias scan lines GBL, any one of the emission control lines EL, and any one of the data lines DL. Each of the subpixels SPX may receive a data voltage of a data line DL according to a write scan signal of a write scan line GWL, and may emit light from a light-emitting element according to the data voltage.

The subpixels SPX may be connected to different data lines DL. For example, the first subpixel SPX1, the second subpixel SPX2, and the third subpixel SPX3 constituting one pixel PX may be connected to a first data line DL1, a second data line DL2, and a third data line DL3, respectively. Accordingly, the emission luminance of each of the subpixels SPX can be individually controlled.

In one or more embodiments, the subpixels SPX constituting each pixel PX may be connected to the same emission control line EL. Accordingly, the subpixels SPX of each pixel PX may or may not emit light substantially simultaneously.

The non-display area NDA includes the scan drivers SDC1 and SDC2 and the display driver 250. In one or more embodiments, the scan drivers SDC1 and SDC2 may include the first scan driver SDC1 and the second scan driver SDC2.

Each of the first scan driver SDC1 and the second scan driver SDC2 may include one or more scan signal output units 611 through 613, and an emission control signal output unit 614. In one or more embodiments, the scan signal output units 611 through 613 may include a write scan signal output unit 611, an initialization scan signal output unit 612, and a bias scan signal output unit 613. Each of the write scan signal output unit 611, the initialization scan signal output unit 612, the bias scan signal output unit 613, and the emission control signal output unit 614 may receive a scan-timing control signal SCS from a timing controller 251.

The write scan signal output unit 611 may generate write scan signals according to the scan-timing control signal SCS of the timing controller 251, and may sequentially output the write scan signals to the write scan lines GWL.

The initialization scan signal output unit 612 may generate initialization scan signals according to the scan-timing control signal SCS, and may sequentially output the initialization scan signals to the initialization scan lines GIL.

The bias scan signal output unit 613 may generate bias scan signals according to the scan-timing control signal SCS, and may sequentially output the bias scan signals to the bias scan lines GBL. The emission control signal output unit 614 may generate emission control signals according to the scan-timing control signal SCS, and may sequentially output the emission control signals to the emission control lines EL.

The display driver 250 includes the timing controller 251 and a data driver 252.

The data driver 252 may receive video data DATA (e.g., digital video data) and a data-timing control signal DCS from the timing controller 251. The data driver 252 converts the video data DATA into analog data voltages according to the data-timing control signal DCS, and outputs the analog data voltages to the data lines DL. For example, the data driver 252 may output data voltages of the first subpixel SPX1, the second subpixel SPX2, and the third subpixel SPX3 to the first data line DL1, the second data line DL2 and the third data line DL3, respectively. Subpixels SPX may be selected by write scan signals of the first scan driver SDC1 and the second scan driver SDC2, and the data voltages may be supplied to the selected subpixels SPX.

Each of the subpixels SPX may emit light in response to an emission control signal of a gate-on voltage supplied from an emission control line EL after a data voltage is supplied, and the emission luminance of each of the subpixels SPX may correspond to the data voltage. For example, one driving cycle of subpixels SPX and a pixel PX including the subpixels SPX may include a data write period during which the subpixels SPX are selected by a write scan signal and supplied with data voltages, respectively, and an emission period during which driving currents corresponding to the data voltages flow through the subpixels SPX in response to an emission control signal.

The timing controller 251 may receive the video data DATA and timing signals from the outside. The timing controller 251 may generate the scan-timing control signal SCS and the data-timing control signal DCS for controlling the display panel 100 according to the timing signals. The timing controller 251 may output the scan-timing control signal SCS to the first scan driver SDC1 and the second scan driver SDC2. The timing controller 251 may output the video data DATA and the data-timing control signal DCS to the data driver 252.

The power supply unit 500 may generate a plurality of panel driving voltages according to a power supply voltage supplied from the outside. For example, the power supply unit 500 may generate a first power supply voltage VDD, a second power supply voltage VSS, a third power supply voltage VINT, and a fourth power supply voltage VAINT and supply them to the display panel 100.

Figure 4:
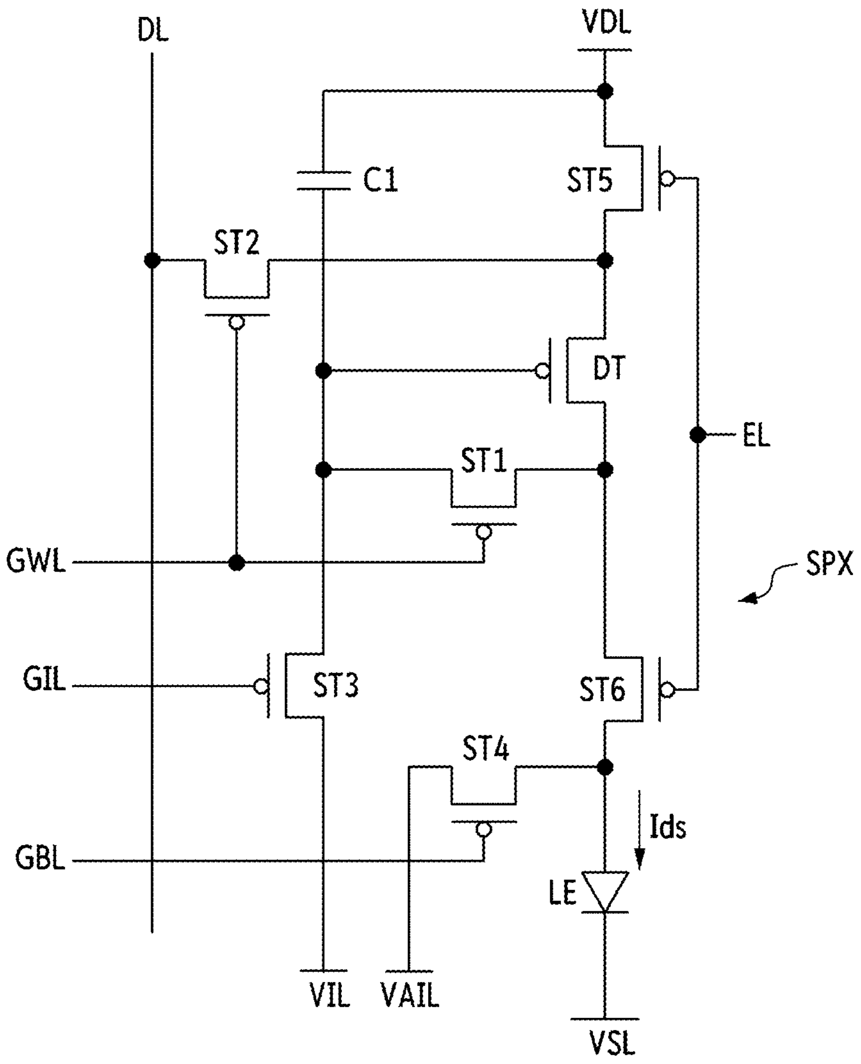
FIG. 4 is an equivalent circuit diagram of a subpixel according to one or more embodiments.

FIG. 4 is an equivalent circuit diagram of a subpixel SPX according to one or more embodiments.

Referring to FIG. 4, the subpixel SPX according to one or more embodiments may be connected to scan lines GWL, GIL, and GBL, an emission control line EL, and a data line DL. For example, the subpixel SPX may be connected to a write scan line GWL, an initialization scan line GIL, a bias scan line GBL, the emission control line EL, and the data line DL.

The subpixel SPX according to one or more embodiments includes a driving transistor DT, switch elements, a capacitor C1, and a light-emitting element LE. The switch elements include first through sixth transistors ST1 through ST6. The driving transistor DT, the switch elements, and the capacitor C1 may form a pixel circuit of the subpixel SPX, and may control a driving current Ids flowing through the light-emitting element LE.

The driving transistor DT includes a gate electrode, a first electrode, and a second electrode. The driving transistor DT controls a drain-source current Ids (hereinafter, referred to as a "driving current") flowing between the first electrode and the second electrode according to a data voltage applied to the gate electrode.

The light-emitting element LE may be a micro-LED. The light-emitting element LE emits light according to the driving current Ids. The amount of light emitted from the light-emitting element LE may be proportional to the driving current Ids. An anode of the light-emitting element LE may be connected to a first electrode of the fourth transistor ST4 and to a second electrode of the sixth transistor ST6, and a cathode may be connected to a second power line VSL to which the second power supply voltage VSS is applied.

The capacitor C1 is formed between the gate electrode of the driving transistor DT and a first power line VDL to which the first power supply voltage VDD is applied. The first power supply voltage VDD may be at a higher level than the second power supply voltage VSS. One electrode of the capacitor C1 may be connected to the gate electrode of the driving transistor DT, and the other electrode may be connected to the first power line VDL.

As illustrated in FIG. 4, the first through sixth transistors ST1 through ST6 and the driving transistor DT may all be formed as p-type metal-oxide-semiconductor field effect transistors (MOSFETs). In this case, an active layer of each of the first through sixth transistors ST1 through ST6 and the driving transistor DT may be made of polysilicon.

A gate electrode of the first transistor ST1 and a gate electrode of the second transistor ST2 may be connected to the write scan line GWL, a gate electrode of the third transistor ST3 may be connected to the initialization scan line GIL, and a gate electrode of the fourth transistor ST4 may be connected to the bias scan line GBL. Because the first through sixth transistors ST1 through ST6 are formed as p-type MOSFETs, they may be turned on when a scan signal of a gate-low voltage and an emission control signal are respectively transmitted to the initialization scan line GIL, the write scan line GWL, the bias scan line GBL, and the emission control line EL. One electrode of the third transistor ST3 may be connected to a first initialization voltage line VIL to which the third power supply voltage VINT is applied, and one electrode of the fourth transistor ST4 may be connected to a second initialization voltage line VAIL to which the fourth power supply voltage VAINT is applied. The third power supply voltage VINT and the fourth power supply voltage VAINT may be different voltages. In addition, the third power supply voltage VINT and the fourth power supply voltage VAINT may be at a lower level than the first power supply voltage VDD, and may be at a higher level than the second power supply voltage VSS.

Alternatively, the driving transistor DT, the second transistor ST2, the fourth transistor ST4, the fifth transistor ST5 and the sixth transistor ST6 may be formed as p-type MOSFETs, while the first transistor ST1 and the third transistor ST3 may be formed as n-type MOSFETs. In this case, the active layer of each of the driving transistor DT, the second transistor ST2, the fourth transistor ST4, the fifth transistor ST5, and the sixth transistor ST6 formed as p-type MOSFETs may be made of polysilicon, and the active layer of each of the first transistor ST1 and the third transistor ST3 formed as n-type MOSFETs may be made of an oxide semiconductor. In addition, because the first transistor ST1 and the third transistor ST3 are formed as n-type MOSFETs, the first transistor ST1 may be turned on in response to a scan signal of a gate-high voltage, and the third transistor ST3 may be turned on in response to an initialization scan signal of a gate-high voltage. On the other hand, because the second transistor ST2, the fourth transistor ST4, the fifth transistor ST5, and the sixth transistor ST6 are formed as p-type MOSFETs, they may be turned on in response to a scan signal of a gate-low voltage and an emission control signal.

Alternatively, the fourth transistor ST4 may be formed as an n-type MOSFET, and the other transistors DT, ST1, ST2, ST3, ST5, and ST6 may be formed as p-type MOSFETs. In this case, the active layer of the fourth transistor ST4 may be made of an oxide semiconductor, and the active layer of each of the other transistors DT, ST1, ST2, ST3, ST5, and ST6 may be made of polysilicon. In addition, the fourth transistor ST4 may be turned on in response to a scan signal of a gate-high voltage, and the other transistors DT, ST1, ST2, ST3, ST5, and ST6 may be turned on in response to a scan signal of a gate-low voltage and an emission control signal.

Alternatively, the first through sixth transistors ST1 through ST6 and the driving transistor DT may all be formed as n-type MOSFETs. In this case, the first through sixth transistors ST1 through ST6 and the driving transistor DT may each have an active layer made of an oxide semiconductor, and may be turned on in response to a scan signal of a gate-high voltage and an emission control signal.

Figure 5:
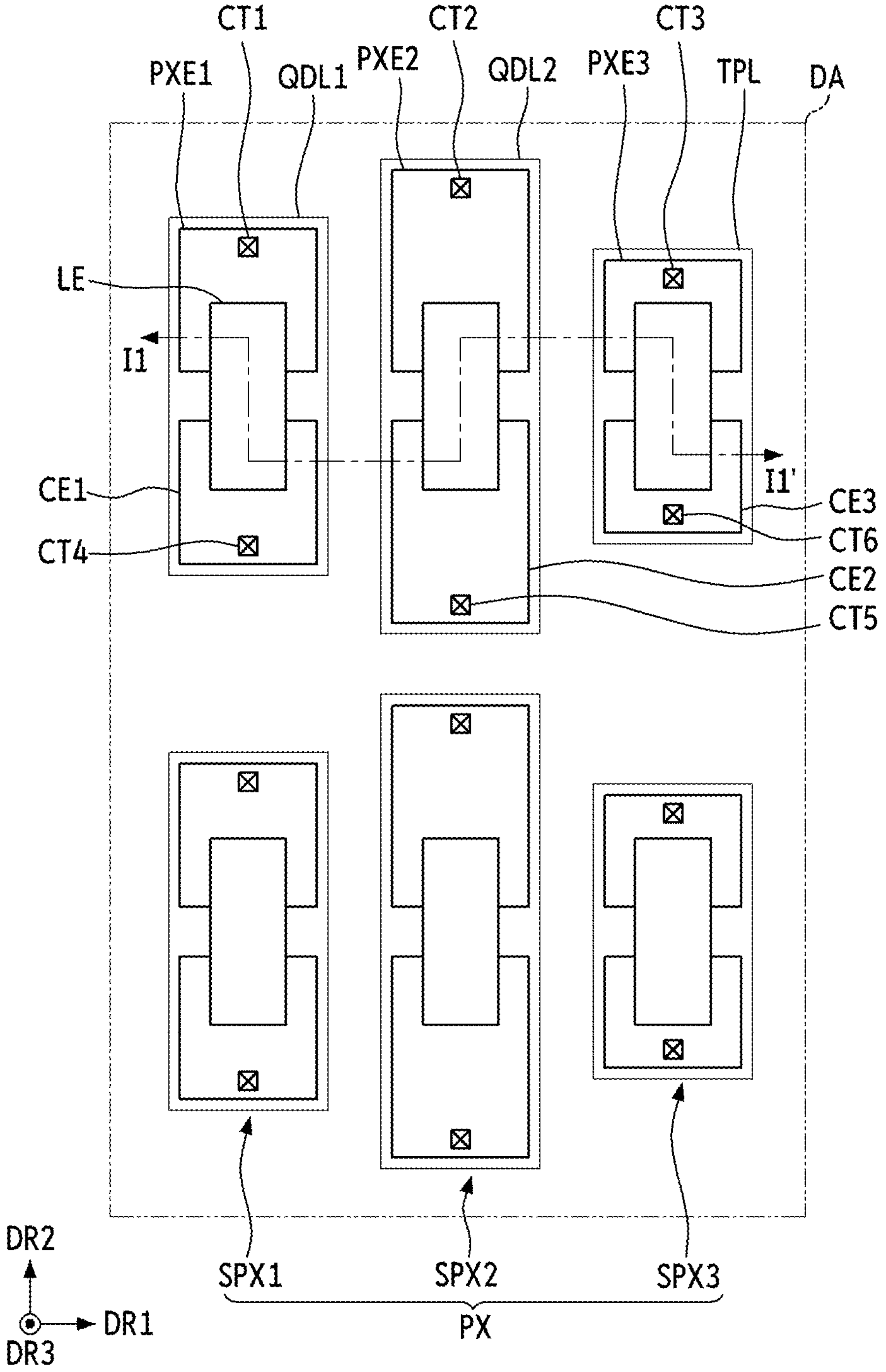
FIG. 5 is a layout view illustrating pixels of a display area according to one or more embodiments.

FIG. 5 is a layout view illustrating pixels PX of a display area DA according to one or more embodiments.

Referring to FIG. 5, each of the pixels PX in the display area DA may include three subpixels SPX1 through SPX3. However, embodiments of the present specification are not limited thereto, and each of the pixels PX may also include four subpixels. When each of the pixels PX includes three subpixels SPX1 through SPX3, it may include a first subpixel SPX1, a second subpixel SPX2, and a third subpixel SPX3.

The pixels PX may be arranged in a matrix form. In each of the pixels PX, the first subpixel SPX1, the second subpixel SPX2, and the third subpixel SPX3 may be arranged in the first direction DR1.

When each of the pixels PX includes three subpixels SPX1 through SPX3, the first subpixel SPX1 may output first light, the second subpixel SPX2 may output second light, and the third subpixel SPX3 may output third light. Here, the first light may be light in a red wavelength band, the second light may be light in a green wavelength band, and the third light may be light in a blue wavelength band. For example, the blue wavelength band may indicate that a main peak wavelength of light is included in a wavelength band of about 370 nm to about 460 nm, the green wavelength band may indicate that a main peak wavelength of light is included in a wavelength band of about 480 nm to about 560 nm, and the red wavelength band may indicate that a main peak wavelength of light is included in a wavelength band of about 600 nm to about 750 nm.

Alternatively, when each of the pixels PX includes four subpixels, one subpixel may output first light, another subpixel may output third light, and the other two subpixels may output second light. Alternatively, the four subpixels may output first light, second light, third light, and fourth light, respectively. Here, the fourth light may be white light.

The first subpixel SPX1 includes a first pixel electrode PXE1 and a light-emitting element LE. When the light-emitting element LE of the first subpixel SPX1 is a flip type or lateral type micro-LED, the first subpixel SPX1 may further include a first common electrode CE1 spaced apart from the first pixel electrode PXE1. In one or more embodiments, the first pixel electrode PXE1 and the first common electrode CE1 may be spaced apart from each other in the second direction DR2, and may each have a rectangular planar shape. However, embodiments are not limited thereto. For example, the arrangement structure, shapes, or sizes of the first pixel electrode PXE1 and the first common electrode CE1 may vary according to embodiments. The light-emitting element LE of the first subpixel SPX1 may be located on the first pixel electrode PXE1 and the first common electrode CE1.

In one or more embodiments, when the light-emitting element LE of the first subpixel SPX1 is a vertical type micro-LED, the first subpixel SPX1 may include a common electrode located on the first pixel electrode PXE1 and the light-emitting element LE (e.g., a common electrode formed in the entire display area DA). For example, when the light-emitting element LE of the first subpixel SPX1 is a vertical type micro-LED, the first subpixel SPX1 may include the first pixel electrode PXE1, the light-emitting element LE, and the common electrode sequentially located along the third direction DR3.

The second subpixel SPX2 includes a second pixel electrode PXE2 and a light-emitting element LE. When the light-emitting element LE of the second subpixel SPX2 is a flip type or lateral type micro-LED, the second subpixel SPX2 may further include a second common electrode CE2 spaced apart from the second pixel electrode PXE2. In one or more embodiments, the second pixel electrode PXE2 and the second common electrode CE2 may be spaced apart from each other in the second direction DR2, and may each have a rectangular planar shape. However, embodiments are not limited thereto. For example, the arrangement structure, shapes, or sizes of the second pixel electrode PXE2 and the second common electrode CE2 may vary according to embodiments. The light-emitting element LE of the second subpixel SPX2 may be located on the second pixel electrode PXE2 and the second common electrode CE2.

In one or more embodiments, when the light-emitting element LE of the second subpixel SPX2 is a vertical type micro-LED, the second subpixel SPX2 may include a common electrode located on the second pixel electrode PXE2 and the light-emitting element LE (e.g., a common electrode formed in the entire display area DA). For example, when the light-emitting element LE of the second subpixel SPX2 is a vertical type micro-LED, the second subpixel SPX2 may include the second pixel electrode PXE2, the light-emitting element LE, and the common electrode sequentially located along the third direction DR3.

The third subpixel SPX3 includes a third pixel electrode PXE3 and a light-emitting element LE. When the light-emitting element LE of the third subpixel SPX3 is a flip type or lateral type micro-LED, the third subpixel SPX3 may further include a third common electrode CE3 spaced apart from the third pixel electrode PXE3. In one or more embodiments, the third pixel electrode PXE3 and the third common electrode CE3 may be spaced apart from each other in the second direction DR2, and may each have a rectangular planar shape. However, embodiments are not limited thereto. For example, the arrangement structure, shapes, or sizes of the third pixel electrode PXE3 and the third common electrode CE3 may vary according to embodiments. The light-emitting element LE of the third subpixel SPX3 may be located on the third pixel electrode PXE3 and the third common electrode CE3.

In one or more embodiments, when the light-emitting element LE of the third subpixel SPX3 is a vertical type micro-LED, the third subpixel SPX3 may include a common electrode located on the third pixel electrode PXE3 and the light-emitting element LE (e.g., a common electrode formed in the entire display area DA). For example, when the light-emitting element LE of the third subpixel SPX3 is a vertical type micro-LED, the third subpixel SPX3 may include the third pixel electrode PXE3, the light-emitting element LE, and the common electrode sequentially located along the third direction DR3.

In FIG. 5, one or more embodiments in which each of the first subpixel SPX1, the second subpixel SPX2, and the third subpixel SPX3 includes one light-emitting element LE is disclosed. However, embodiments are not limited thereto. For example, at least one of the first subpixel SPX1, the second subpixel SPX2, and/or the third subpixel SPX3 may also include a plurality of light-emitting elements LE.

In one or more embodiments, the first subpixel SPX1, the second subpixel SPX2, and the third subpixel SPX3 may include light-emitting elements LE that emit third light. In addition, the first subpixel SPX1 may include a first light conversion layer QDL1 for converting third light into first light, the second subpixel SPX2 may include a second light conversion layer QDL2 for converting third light into second light, and the third subpixel SPX3 may include a light transmission layer TPL (or a third light conversion layer) for transmitting third light. In one or more embodiments, the area of the first subpixel SPX1, the area of the second subpixel SPX2, and the area of the third subpixel SPX3 may be set according to the light conversion efficiency of the first light conversion layer QDL1 and the light conversion efficiency of the second light conversion layer QDL2. For example, the lower the light conversion efficiency, the larger the area of a subpixel (e.g., the area of an emission area).

For example, when the light conversion efficiency of the second light conversion layer QDL2 is lower than the light conversion efficiency of the first light conversion layer QDL1, the area of the second pixel electrode PXE2 and the area of the second common electrode CE2 may be greater than the area of the first pixel electrode PXE1 and the area of the first common electrode CE1 as illustrated in FIG. 5. In addition, because the first light conversion layer QDL1 must convert light, whereas the light transmission layer TPL transmits light of the light-emitting elements LE as it is, the area of the first pixel electrode PXE1 and the area of the first common electrode CE1 may be greater than the area of the third pixel electrode PXE3 and the area of the third common electrode CE3.

Each of the pixel electrodes PXE1 through PXE3 may be electrically connected to at least one transistor through a pixel connection hole CT1, CT2, or CT3. For example, each of the first pixel electrode PXE1, the second pixel electrode PXE2, and the third pixel electrode PXE3 may be electrically connected to a second electrode of the fourth transistor ST4 (see FIG. 4) and to the second electrode of the sixth transistor ST6 (see FIG. 4) of a corresponding subpixel SPX through a first pixel connection hole CT1, a second pixel connection hole CT2, or a third pixel connection hole CT3.

Each of the common electrodes CE1 through CE3 may be connected to the second power line VSL through a common connection hole CT4, CT5, or CT6. For example, the first common electrode CE1, the second common electrode CE2, and the third common electrode CE3 may be connected to the second power line VSL through a first common connection hole CT4, a second common connection hole CT5, and a third common connection hole CT6, respectively. Accordingly, the second power voltage VSS may be applied to the common electrodes CE1 through CE3.

The light-emitting elements LE of the subpixels SPX1 through SPX3 may emit third light, for example, light in the blue wavelength band, but embodiments of the present specification are not limited thereto. If the light-emitting element LE of the first subpixel SPX1 emits first light, the light-emitting element LE of the second subpixel SPX2 emits second light, and the light-emitting element LE of the third subpixel SPX3 emits third light, the light conversion layers QDL1 and QDL2 and the light transmission layer TPL may be omitted. For example, each of the first subpixel SPX1, the second subpixel SPX2, and the third subpixel SPX3 may or may not include the first light conversion layer QDL1, the second light conversion layer QDL2, or the light transmission layer TPL depending on whether the color or wavelength of light emitted from the light-emitting element LE is to be converted or depending on luminous efficiency.

The first light conversion layer QDL1 may completely overlap the first pixel electrode PXE1 and the light-emitting element LE of the first subpixel SPX1. The area of the first light conversion layer QDL1 may be greater than the area of the first pixel electrode PXE1. The first light conversion layer QDL1 may convert or shift a peak wavelength of incident light into another corresponding peak wavelength, and may output light of the corresponding peak wavelength. For example, the first light conversion layer QDL1 may convert or shift third light emitted from the light-emitting element LE of the first subpixel SPX1 into first light.

The second light conversion layer QDL2 may completely overlap the second pixel electrode PXE2 and the light-emitting element LE of the second subpixel SPX2. The area of the second light conversion layer QDL2 may be greater than the area of the second pixel electrode PXE2. The second light conversion layer QDL2 may convert or shift a peak wavelength of incident light into another corresponding peak wavelength, and may output light of the specific peak wavelength. For example, the second light conversion layer QDL2 may convert or shift third light emitted from the light-emitting element LE of the second subpixel SPX2 into second light.

The light transmission layer TPL may completely overlap the third pixel electrode PXE3 and the light-emitting element LE of the third subpixel SPX3. The light transmission layer TPL may transmit incident light as it is. For example, the light transmission layer TPL may transmit third light emitted from the light-emitting element LE of the third subpixel SPX3 as it is.

Figure 6:
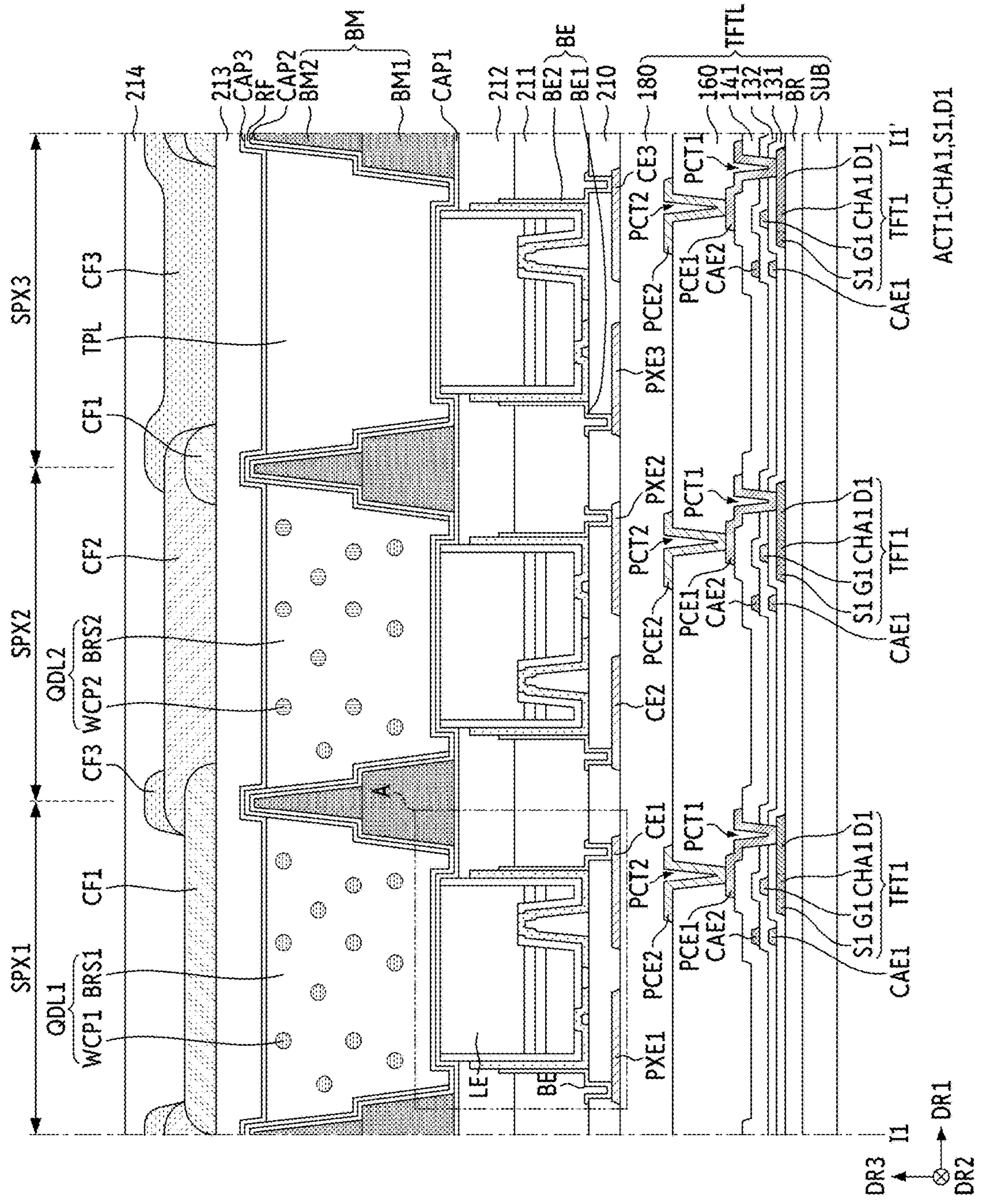
FIG. 6 is a cross-sectional view illustrating an example of a cross section of a display panel corresponding to line I1-I1' of FIG. 5.
Figure 7:
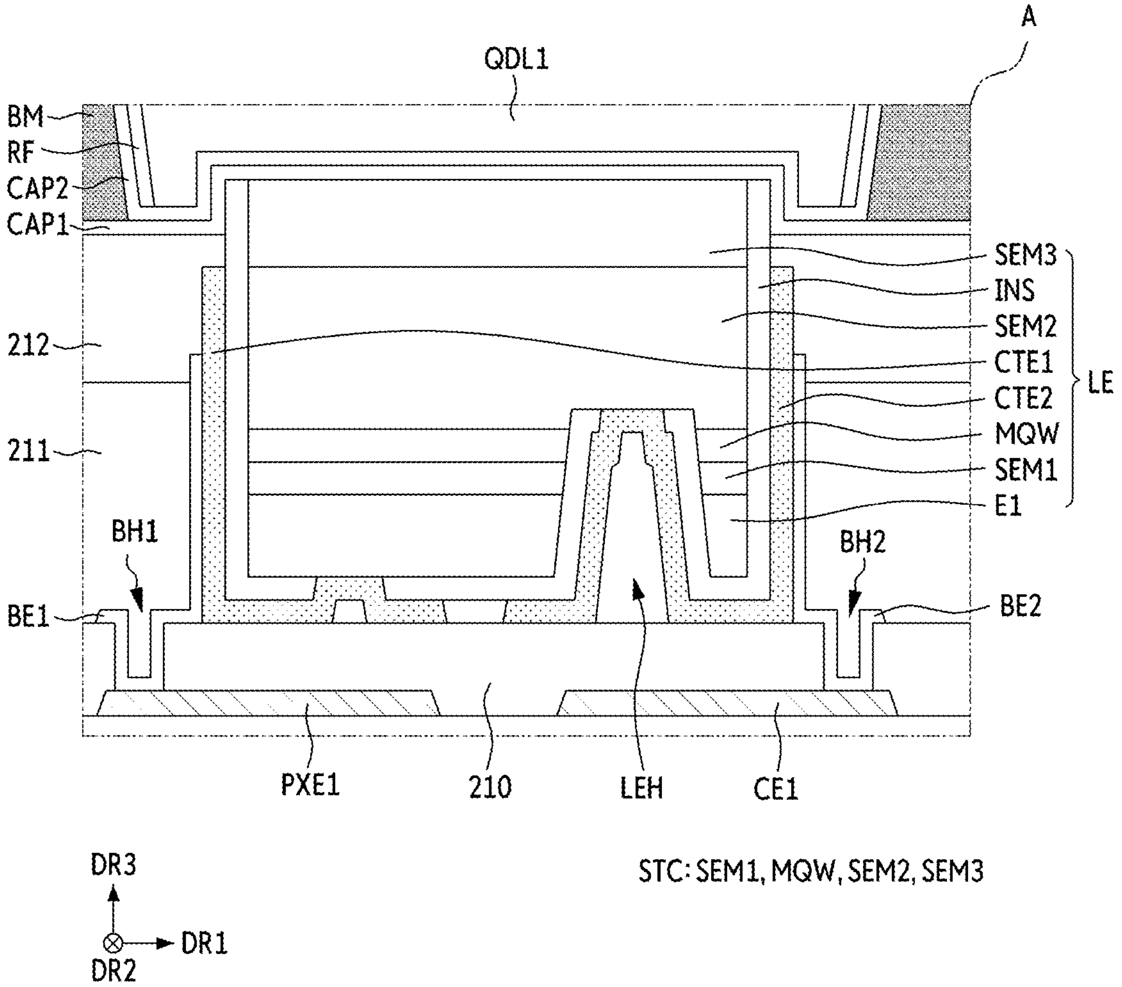
FIG. 7 is a detailed cross-sectional view of an example of area A of FIG. 6.

FIG. 6 is a cross-sectional view illustrating an example of a cross section of the display panel 100 corresponding to line I1-I1' of FIG. 5. FIG. 7 is a detailed cross-sectional view of an example of area A of FIG. 6.

Referring to FIGS. 6 and 7, a substrate SUB may be made of an insulating material, such as glass or polymer resin. When the substrate SUB is made of polymer resin, it may be a flexible substrate that can be stretched. The polymer resin may be acryl resin, epoxy resin, phenolic resin, polyamide resin, or polyimide resin.

A barrier layer BR may be located on the substrate SUB. The barrier layer BR is a layer for protecting transistors of a thin-film transistor layer TFTL and light-emitting elements LE located on the thin-film transistor layer TFTL from moisture introduced through the substrate SUB, which is vulnerable to moisture penetration. The barrier layer BR may be composed of a plurality of inorganic layers stacked alternately.

Thin-film transistors TFT1 may be located on the barrier layer BR. Each of the thin-film transistors TFT1 may be any one of the fourth transistor ST4 and/or the sixth transistor ST6 illustrated in FIG. 4. Each of the thin-film transistors TFT1 may include a first active layer ACT1 and a first gate electrode G1.

The first active layer ACT1 of each of the thin-film transistors TFT1 may be located on the barrier layer BR. The first active layer ACT1 of each of the thin-film transistors TFT1 may include polycrystalline silicon, monocrystalline silicon, low-temperature polycrystalline silicon, or amorphous silicon. Alternatively, the first active layer ACT1 of each of the thin-film transistors TFT1 may be made of an oxide semiconductor including IGZO (indium (In), gallium (Ga), zinc (Zn) and oxygen (O)), IGZTO (indium (In), gallium (Ga), zinc (Zn), tin (Sn) and oxygen (O)), or IGTO (indium (In), gallium (Ga), tin (Sn), and/or oxygen (O)).

The first active layer ACT1 may include a first channel region CHA1, a first source region S1, and a first drain region D1. The first channel region CHA1 may be a region overlapped by the first gate electrode G1 in the third direction DR3, which is the thickness direction of the substrate SUB. The first source region S1 may be located on a side of the first channel region CHA1, and the first drain region D1 may be located on the other side of the first channel region CHA1. The first source region S1 and the first drain region D1 may be regions not overlapped by the first gate electrode G1 in the third direction DR3. The first source region S1 and the first drain region D1 may be regions formed to have conductivity by doping a semiconductor material with ions.

A first gate-insulating layer 131 may be located on the first channel regions CHA1, the first source regions S1, and the first drain regions D1 of the thin-film transistors TFT1.

A first gate metal layer may be located on the first gate-insulating layer 131. The first gate metal layer may include the first gate electrodes G1 of the thin-film transistors TFT1 and first capacitor electrodes CAE1. The first gate electrodes G1 may overlap the first active layers ACT1 in the third direction DR3. In FIG. 6, the first gate electrodes G1 and the first capacitor electrodes CAE1 are spaced apart from each other. However, when each of the thin-film transistors TFT1 is the driving transistor DT of FIG. 4, the first gate electrodes G1 and the first capacitor electrodes CAE1 may be electrically or physically connected to each other. Alternatively, when each of the thin-film transistors TFT1 is any one of the first through sixth transistors ST1 through ST6 of FIG. 4, the first gate electrodes G1 and the first capacitor electrodes CAE1 may not be electrically or physically connected to each other.

A second gate-insulating layer 132 may be located on the first gate electrodes G1 of the thin-film transistors TFT1 and the first capacitor electrodes CAE1.

A second gate metal layer may be located on the second gate-insulating layer 132. The second gate metal layer may include second capacitor electrodes CAE2. The second capacitor electrodes CAE2 may overlap the first capacitor electrodes CAE1 in the third direction DR3. Because the second gate-insulating layer 132 has a dielectric constant (e.g., predetermined dielectric constant), capacitors C1 (see FIG. 4) may be formed by the first capacitor electrodes CAE1, the second capacitor electrodes CAE2, and the second gate-insulating layer 132 located between them.

A first interlayer insulating layer 141 may be located on the second capacitor electrodes CAE2.

A first data metal layer may be located on the interlayer insulating layer 141. The first data metal layer may include first source connection electrodes PCE1. The first source connection electrodes PCE1 may be connected to the first drain regions D1 of the first active layers ACT1 through first source contact holes PCT1 penetrating the first gate-insulating layer 131, the second gate-insulating layer 132, and the interlayer insulating layer 141.

A first planarization layer 160 may be located on the first source connection electrodes PCE1 to flatten steps caused by the thin-film transistors TFT1.

A second data metal layer may be located on the first planarization layer 160. The second data metal layer may include second source connection electrodes PCE2. The second source connection electrodes PCE2 may be connected to the first source connection electrodes PCE1 through second source contact holes PCT2 penetrating the first planarization layer 160.

A second planarization layer 180 may be located on the second source connection electrodes PCE2.

The barrier layer BR, the first gate-insulating layer 131, the second gate-insulating layer 132, and the interlayer insulating layer 141 may be made of an inorganic layer, for example, silicon nitride ($SiN_x$), silicon oxynitride (SiON), silicon oxide ($SiO_x$), titanium oxide ($TiO_x$), or aluminum oxide ($AlO_x$).

The first gate metal layer, the second gate metal layer, the first data metal layer, and the second data metal layer may each be a single layer or a multilayer made of any one or more of molybdenum (Mo), aluminum (Al), chromium (Cr), gold (Au), titanium (Ti), nickel (Ni), neodymium (Nd), copper (Cu), and/or alloys thereof.

The first planarization layer 160 and the second planarization layer 180 may be made of an organic layer, such as acryl resin, epoxy resin, phenolic resin, polyamide resin, or polyimide resin.

A light-emitting element layer may be located on the second planarization layer 180. The light-emitting element layer may include pixel electrodes PXE1 through PXE3, common electrodes CE1 through CE3, light-emitting elements LE, and organic layers 210, 211 and 212.

A pixel electrode layer may be located on the second planarization layer 180. The pixel electrode layer may include a first pixel electrode PXE1, a second pixel electrode PXE2, and a third pixel electrode PXE3. In one or more embodiments, each of the light-emitting elements LE may be a flip type micro-LED. The flip type micro-LED refers to an LED in which contact electrodes CTE1 and CTE2 are formed on a surface (e.g., a lower surface) of a light-emitting element LE. When the light-emitting elements LE are flip type micro-LEDs, the pixel electrode layer may further include a first common electrode CE1, a second common electrode CE2, and a third common electrode CE3.

Each of the pixel electrodes PXE1 through PXE3 may be connected to a second source connection electrode PCE2 through a pixel connection hole CT1, CT2, or CT3 (see FIG. 5) penetrating the second planarization layer 180. Each of the pixel electrodes PXE1 through PXE3 may be connected to the first source region S1 or the first drain region D1 of a thin-film transistor TFT1 through a first source connection electrode PCE1 and a second source connection electrode PCE2. Therefore, a voltage controlled by a thin-film transistor TFT1 may be applied to each of the pixel electrodes PXE1 through PXE3.

The pixel electrode layer may be a single layer or a multilayer made of any one or more of molybdenum (Mo), aluminum (Al), chromium (Cr), gold (Au), titanium (Ti), nickel (Ni), neodymium (Nd), copper (Cu), and/or alloys thereof. For example, the pixel electrode layer may be made of copper (Cu) with low sheet resistance to lower the resistance of each of the pixel electrodes PXE1 through PXE3 and the common electrodes CE1 through CE3.

A first organic layer 210 may be located on the pixel electrodes PXE1 through PXE3 and the common electrodes CE1 through CE3. The first organic layer 210 temporarily fixes or attaches a plurality of light-emitting elements LE to prevent or reduce the likelihood of the light-emitting elements LE tilting or falling during a process of transferring the light-emitting elements LE to the display panel 100. That is, the first organic layer 210 may be a layer for temporarily attaching a plurality of light-emitting elements LE onto the pixel electrodes PXE1 through PXE3 and the common electrodes CE1 through CE3. To facilitate the temporary adhesion, the first organic layer 210 may be thicker than each of the pixel electrodes PXE1 through PXE3 and the common electrodes CE1 through CE3, and may be thicker than each of the contact electrodes CTE1 and CTE2 of the light-emitting elements LE.

The first organic layer 210 may be a photosensitive organic layer, such as photoresist. Alternatively, the first organic layer 210 may be made of acryl resin, epoxy resin, phenolic resin, polyamide resin, or polyimide resin.

The light-emitting elements LE may be located on the first organic layer 210. Each of the light-emitting elements LE may be made of an inorganic material, such as gallium nitride (GaN). Each of the light-emitting elements LE may have a length of several to hundreds of μm in each of the first direction DR1, the second direction DR2, and the third direction DR3. For example, each of the light-emitting elements LE may have a length of about 100 μm or less in each of the first direction DR1, the second direction DR2, and the third direction DR3.

The light-emitting elements LE may be grown on a semiconductor substrate, such as a silicon substrate or a sapphire substrate. The light-emitting elements LE may be directly transferred from the semiconductor substrate onto the pixel electrodes PXE1 through PXE3 and the common electrodes CE1 through CE3 of the display panel 100. Alternatively, the light-emitting elements LE may be transferred onto the pixel electrodes PXE1 through PXE3 and the common electrodes CE1 through CE3 of the display panel 100 through an electrostatic method using an electrostatic head or a stamp method using an elastic polymer material, such as PDMS or silicon, as a transfer substrate.

Referring to FIG. 7, each of the light-emitting elements LE may include a conductive layer E1, a semiconductor stack STC, contact electrodes CTE1 and CTE2, and a protective layer INS. The semiconductor stack STC may include a first semiconductor layer SEM1, an active layer MQW, and a second semiconductor layer SEM2 sequentially located in the third direction DR3. In one or more embodiments, the semiconductor stack STC may further include a third semiconductor layer SEM3 on the second semiconductor layer SEM2.

The conductive layer E1 may be located on a lower surface of the first semiconductor layer SEM1. Although the conductive layer E1 covers the entire lower surface of the first semiconductor layer SEM1 in FIG. 7, embodiments of the present specification are not limited thereto. For example, the conductive layer E1 may also be located on a portion of the lower surface of the first semiconductor layer SEM1. The conductive layer E1 may include any one of molybdenum (Mo), aluminum (Al), chromium (Cr), gold (Au), titanium (Ti), nickel (Ni), neodymium (Nd), and/or copper (Cu), or may include a transparent conductive material, such as metal oxide.

The first semiconductor layer SEM1 may be located on the conductive layer E1. The first semiconductor layer SEM1 may be made of a semiconductor material layer, for example, gallium nitride (GaN) doped with a first conductivity type dopant, such as magnesium (Mg), zinc (Zn), calcium (Ca), strontium (Sr), or barium (Ba).

The active layer MQW may be located on the first semiconductor layer SEM1. The active layer MQW may include the same semiconductor material as the first semiconductor layer SEM1 and the second semiconductor layer SEM2. For example, when the first semiconductor layer SEM1 and the second semiconductor layer SEM2 include gallium nitride (GaN), the active layer MQW may also include gallium nitride (GaN). For example, the active layer MQW may include at least any one of gallium nitride (GaN), indium gallium nitride (InGaN), and/or aluminum gallium nitride (AlGaN). The active layer MQW may emit light through combination of electron-hole pairs according to electrical signals received through the first semiconductor layer SEM1 and the second semiconductor layer SEM2.

The active layer MQW may include a material having a single or multiple quantum well structure. When the active layer MQW includes a material having a multiple quantum well structure, it may be a structure in which a plurality of well layers and a plurality of barrier layers are alternately stacked. Here, the well layers may be made of InGaN, and the barrier layers may be made of GaN or AlGaN, but embodiments are not limited thereto. Alternatively, the active layer MQW may be a structure in which a semiconductor material having a large band gap energy and a semiconductor material having a small band gap energy are alternately stacked or may include different Group III, Group IV, and/or Group V semiconductor materials depending on the wavelength band of light that it emits.

When the active layer MQW includes indium gallium nitride (InGaN), the color of light that it emits may vary according to indium content. For example, as the indium content increases, the wavelength band of light emitted from the active layer MQW may move to the red wavelength band, and as the indium content decreases, the wavelength band of light emitted from the active layer MQW may move to the blue wavelength band. For example, the indium content of the active layer MQW of a light-emitting element LE that emits third light (light in the blue wavelength band) may be about 10 wt % to about 20 wt %.

The second semiconductor layer SEM2 may be located on the active layer MQW. The second semiconductor layer SEM2 may be made of a semiconductor material layer, for example, gallium nitride (GaN) doped with a second conductivity type dopant, such as silicon (Si), germanium (Ge), or tin (Sn).

The third semiconductor layer SEM3 may be located on the second semiconductor layer SEM2. The third semiconductor layer SEM3 may be a semiconductor material layer having an n-type dopant lower than a threshold value (e.g., predetermined threshold value), and may be referred to as an undoped semiconductor layer. For example, the third semiconductor layer SEM3 may be indium aluminum gallium nitride (InAlGaN), gallium nitride (GaN), aluminum gallium nitride (AlGaN), indium gallium nitride (InGaN), aluminum nitride (AlN), or indium nitride (InN) having an n-type dopant lower than a threshold value (e.g., predetermined threshold value).

An electron-blocking layer may be located between the first semiconductor layer SEM1 and the active layer MQW. The electron-blocking layer may be a layer for suppressing or preventing too many electrons from flowing into the active layer MQW. For example, the electron-blocking layer may be AlGaN or p-AlGaN doped with p-type Mg. The electron-blocking layer can be omitted, in one or more embodiments.

A superlattice layer may be located between the active layer MQW and the second semiconductor layer SEM2. The superlattice layer may be a layer for relieving stress between the second semiconductor layer SEM2 and the active layer MQW. For example, the superlattice layer may be made of InGaN or GaN. The superlattice layer can be omitted.

The protective layer INS may be located on side surfaces of the first semiconductor layer SEM1, side surfaces of the active layer MQW, and side surfaces of the second semiconductor layer SEM2. The protective layer INS may also be located on side surfaces of the conductive layer E1. The protective layer INS may be a layer for protecting side surfaces of each light-emitting element LE. The protective layer INS may be made of an inorganic layer, for example, silicon nitride ($SiN_x$), silicon oxynitride (SiON), silicon oxide ($SiO_x$), titanium oxide ($TiO_x$), or aluminum oxide ($AlO_x$).

In FIG. 7, the protective layer INS is located on the side surfaces of the first semiconductor layer SEM1, the side surfaces of the active layer MQW, the side surfaces of the second semiconductor layer SEM2, and side surfaces of the third semiconductor layer SEM3 of the semiconductor stack STC. However, embodiments are not limited thereto. For example, the protective layer INS may be located on the side surfaces of the first semiconductor layer SEM1, the side surfaces of the active layer MQW, and the side surfaces of the second semiconductor layer SEM2 of the semiconductor stack STC, and is not located on the side surfaces of the third semiconductor layer SEM3.

A hole LEH may be formed to pass through the conductive layer E1, the first semiconductor layer SEM1, and the active layer MQW of each light-emitting element LE, and may expose the second semiconductor layer SEM2. The hole LEH may have a circular planar shape, but embodiments of the present specification are not limited thereto. For example, the hole LEH may also have an elliptical planar shape or a polygonal planar shape, such as a quadrangle.

In addition, the protective layer INS may be located on sidewalls of the conductive layer E1, sidewalls of the first semiconductor layer SEM1, and sidewalls of the active layer MQW exposed in the hole LEH (e.g., inner sidewalls). The protective layer INS may not cover the second semiconductor layer SEM2 in the hole LEH. Therefore, the second semiconductor layer SEM2 may be exposed without being covered by the protective layer INS.

A first contact electrode CTE1 may be located on (e.g., may overlap) at least one side surface of the semiconductor stack STC, and on at least one side surface and on a lower surface of the conductive layer E1. The first contact electrode CTE1 may be located on (e.g., directly on) the lower surface (e.g., a portion of the lower surface) of the conductive layer E1 that is exposed without being covered by the protective layer INS. Therefore, the first contact electrode CTE1 may be electrically connected to the conductive layer E1.

A second contact electrode CTE2 may be located on (e.g., may overlap) at least one side surface of the semiconductor stack STC and on at least one side surface and on the lower surface of the conductive layer E1. Here, while the first contact electrode CTE1 is located on a first side surface of the semiconductor stack STC and a first side surface of the conductive layer E1, the second contact electrode CTE2 may be located on a second side surface of the semiconductor stack STC and a second side surface of the conductive layer E1.

The second contact electrode CTE2 may be located on the protective layer INS located in the hole LEH and the second semiconductor layer SEM2 exposed in the hole LEH without being covered by the protective layer INS. Therefore, the second contact electrode CTE2 may be electrically connected to the second semiconductor layer SEM2 in the hole LEH.

In FIGS. 6 and 7, the first contact electrode CTE1 and the second contact electrode CTE2 of each light-emitting element LE are located on the first organic layer 210, but embodiments of the present specification are not limited thereto. For example, the first organic layer 210 may also be located on a lower surface and a portion of a side surface of the first contact electrode CTE1 and a lower surface and a portion of a side surface of the second contact electrode CTE2 of each light-emitting element LE. Alternatively, the first organic layer 210 may be located on the side surfaces of the conductive layer E1 of each light-emitting element LE. Alternatively, the first organic layer 210 may be located on the side surfaces of the first semiconductor layer SEM1, the side surfaces of the active layer MQW, and the side surfaces of the second semiconductor layer SEM2 of each light-emitting element LE. In this case, the first organic layer 210 may be located on a portion of each side surface of the second semiconductor layer SEM2.

Each of the first contact electrode CTE1 and the second contact electrode CTE2 may be located on three side surfaces of the semiconductor stack STC. For example, when the semiconductor stack STC includes first through fourth side surfaces, the first contact electrode CTE1 may be located on the first side surface, the second side surface and the third side surface, and the second contact electrode CTE2 may be located on the second side surface, the third side surface and the fourth side surface.

Each of the first contact electrode CTE1 and the second contact electrode CTE2 may include any one of molybdenum (Mo), aluminum (Al), chromium (Cr), gold (Au), titanium (Ti), nickel (Ni), neodymium (Nd), and/or copper (Cu). In one or more embodiments, to increase reflectivity, each of the first contact electrode CTE1 and the second contact electrode CTE2 may have a two-layer structure of chromium (Cr) and gold (Au), a three-layer structure of titanium (Ti), aluminum (Al), and titanium (Ti), or a three-layer structure of indium tin oxide (ITO), silver (Ag), and indium tin oxide (ITO).

When each of the first contact electrode CTE1 and the second contact electrode CTE2 is made of a metal with high reflectivity, light travelling in a lateral direction of each light-emitting element LE among light emitted from the active layer MQW of the light-emitting element LE may be reflected by the first contact electrode CTE1 and the second contact electrode CTE2 to exit from an upper surface of the light-emitting element LE. Accordingly, a loss of light of the light-emitting element LE can be reduced, and thus the light efficiency of the light-emitting element LE can be increased. Therefore, to increase the light efficiency of each light-emitting element LE, each of the first contact electrode CTE1 and the second contact electrode CTE2 may cover most of the side surfaces of the semiconductor stack STC.

A first connection electrode BE1 connects the first contact electrode CTE1 of each light-emitting element LE to a pixel electrode PXE1, PXE2, or PXE3. The first connection electrode BE1 may be connected to the pixel electrode PXE1, PXE2, or PXE3 exposed through a first connection hole BH1 penetrating the first organic layer 210. In addition, the first connection electrode BE1 may be located on an upper surface of the first organic layer 210 and the first contact electrode CTE1.

A second connection electrode BE2 connects the second contact electrode CTE2 of each light-emitting element LE to a common electrode CE1, CE2, or CE3. The second connection electrode BE2 may be connected to the common electrode CE1, CE2, or CE3 exposed through a second connection hole BH2 penetrating the first organic layer 210. In addition, the second connection electrode BE2 may be located on the upper surface of the first organic layer 210 and the second contact electrode CTE2.

Each of the first connection electrode BE1 and the second connection electrode BE2 may include any one of molybdenum (Mo), aluminum (Al), chromium (Cr), gold (Au), titanium (Ti), nickel (Ni), neodymium (Nd), and/or copper (Cu). Alternatively, each of the first connection electrode BE1 and the second connection electrode BE2 may be made of a transparent conductive material (TCO), such as indium tin oxide (ITO) or indium zinc oxide (IZO).

When the connection electrodes BE are made of a metal material with high reflectivity, such as aluminum (Al), light travelling in the lateral direction of each light-emitting element LE among light emitted from the active layer MQW of the light-emitting element LE may be reflected by the connection electrodes BE toward the top of the light-emitting element LE. Accordingly, a loss of light of the light-emitting element LE can be reduced, and thus the light efficiency of the light-emitting element LE can be increased.

As illustrated in FIGS. 6 and 7, the conductive layer E1 of each light-emitting element LE may be connected to a pixel electrode PXE1, PXE2, or PXE3 through the first contact electrode CTE1 and the first connection electrode BE1. In addition, the second semiconductor layer SEM2 of each light-emitting element LE may be connected to a common electrode CE1, CE2, or CE3 through the second contact electrode CTE2 formed in the hole LEH and the second connection electrode BE2. The pixel electrodes PXE1 through PXE3 may be referred to as anodes or first electrodes, and the common electrodes CE1 through CE3 may be referred to as cathodes or second electrodes.

A third organic layer 211 may partially cover the side surfaces of the light-emitting elements LE. In addition, the third organic layer 211 may cover the connection electrodes BE, but at least a portion of each of the connection electrodes BE may be exposed without being covered by the third organic layer 211.

A fourth organic layer 212 may be located on the third organic layer 211. The fourth organic layer 212 may partially cover the side surfaces of each of the light-emitting elements LE. The fourth organic layer 212 may be located on at least a portion of each of the connection electrodes BE exposed without being covered by the third organic layer 211. The upper surface of each of the light-emitting elements LE may be exposed without being covered by the fourth organic layer 212.

The third organic layer 211 and the fourth organic layer 212 may be made of an organic layer, such as acryl resin, epoxy resin, phenolic resin, polyamide resin, or polyimide resin.

The third organic layer 211 and the fourth organic layer 212 are layers for flattening steps caused by the light-emitting elements LE. If the third organic layer 211 is high enough to cover most of the side surfaces of each of the light-emitting elements LE, the fourth organic layer 212 may be omitted.

A first capping layer CAP1 may be located on the light-emitting elements LE, the third organic layer 211, and the fourth organic layer 212.

A light-blocking layer BM, a first light conversion layer QDL1, a second light conversion layer QDL2, and a light transmission layer TPL may be located on the first capping layer CAP1. The first light conversion layer QDL1, the second light conversion layer QDL2, and the light transmission layer TPL may be separated or partitioned by the light-blocking layer BM. The first light conversion layer QDL1 may be located on the first capping layer CAP1 in a first subpixel SPX1, the second light conversion layer QDL2 may be located on the first capping layer CAP1 in a second subpixel SPX2, and the light transmission layer TPL may be located on the first capping layer CAP1 in a third subpixel SPX3. The light-blocking layer BM may overlap the third organic layer 211 and the fourth organic layer 212 in the third direction DR3, and may not overlap the light-emitting elements LE.

The first light conversion layer QDL1 may convert a portion of third light (light in the blue wavelength band) incident from a light-emitting element LE into first light (light in the red wavelength band). The first light conversion layer QDL1 may include a first base resin BRS1 and first wavelength conversion particles WCP1. The first base resin BRS1 may include a light-transmitting organic material. The first wavelength conversion particles WCP1 may convert a portion of the third light (light in the blue wavelength band) incident from the light-emitting element LE into the first light (light in the red wavelength band).

The second light conversion layer QDL2 may convert a portion of third light (light in the blue wavelength band) incident from a light-emitting element LE into second light (light in the green wavelength band). The second light conversion layer QDL2 may include a second base resin BRS2 and second wavelength conversion particles WCP2. The second base resin BRS2 may include a light-transmitting organic material. The second wavelength conversion particles WCP2 may convert a portion of the third light (light in the blue wavelength band) incident from the light-emitting element LE into the second light (light in the green wavelength band).

The light transmission layer TPL may include a light-transmitting organic material.

For example, the first base resin BRS1, the second base resin BRS2, and the light transmission layer TPL may include epoxy resin, acrylic resin, cardo resin, or imide resin. The first and second wavelength conversion particles WCP1 and WCP2 may be quantum dots, quantum rods, fluorescent materials, or phosphorescent materials.

The light-blocking layer BM may include a first light-blocking layer BM1 and a second light-blocking layer BM2 stacked sequentially. A length of the first light-blocking layer BM1 in the first direction DR1 or a length of the first light-blocking layer BM1 in the second direction DR2 may be greater than a length of the second light-blocking layer BM2 in the first direction DR1 or a length of the second light-blocking layer BM2 in the second direction DR2. The first light-blocking layer BM1 and the second light-blocking layer BM2 may be made of an organic layer, such as acryl resin, epoxy resin, phenolic resin, polyamide resin, or polyimide resin. The first light-blocking layer BM1 and the second light-blocking layer BM2 may include a light-blocking material to reduce or prevent light of the light-emitting element LE of any one subpixel travelling to a neighboring subpixel. For example, the first light-blocking layer BM1 and the second light-blocking layer BM2 may include an inorganic black pigment, such as carbon black or an organic black pigment.

A second capping layer CAP2 may be located on the first capping layer CAP1 and the light-blocking layer BM. The second capping layer CAP2 may be located on side and upper surfaces of the light-blocking layer BM. For example, the second capping layer CAP2 may be located on side surfaces of the first light-blocking layer BM1 and side and upper surfaces of the second light-blocking layer BM2.

A reflective layer RF may be located between the light-blocking layer BM and the first light conversion layer QDL1, between the light-blocking layer BM and the second light conversion layer QDL2, and between the light-blocking layer BM and the light transmission layer TPL. The reflective layer RF may be located on the second capping layer CAP2 located on the side surfaces of the first light-blocking layer BM1 and on the side surfaces of the second light-blocking layer BM2. The reflective layer RF may reflect light travelling in the lateral direction from the first light conversion layer QDL1, the second light conversion layer QDL2, and the light transmission layer TPL.

The reflective layer RF may include a metal material with high reflectivity, such as aluminum (Al). A thickness of the reflective layer RF may be about 0.1 μm.

Alternatively, to serve as distributed Bragg reflectors, the reflective layer RF may include M (M is an integer of 2 or more) pairs of first and second layers having different refractive indices. In this case, M first layers and M second layers may be arranged alternately. The first and second layers may be made of an inorganic layer, for example, silicon nitride ($SiN_x$), silicon oxynitride (SiON), silicon oxide ($SiO_x$), titanium oxide ($TiO_x$), or aluminum oxide ($AlO_x$).

A third capping layer CAP3 may be located on the second capping layer CAP2, the first light conversion layer QDL1, the second light conversion layer QDL2, and the light transmission layer TPL.

The first capping layer CAP1, the second capping layer CAP2, and the third capping layer CAP3 may be made of an inorganic layer, for example, silicon nitride ($SiN_x$), silicon oxynitride (SiON), silicon oxide ($SiO_x$), titanium oxide ($TiO_x$), or aluminum oxide ($AlO_x$). The first light conversion layer QDL1, the second light conversion layer QDL2, and the light transmission layer TPL may be encapsulated by the first capping layer CAP1, the second capping layer CAP2, and the third capping layer CAP3.

A fifth organic layer 213 may be located on the third capping layer CAP3. A plurality of color filters CF1 through CF3 may be located on the fifth organic layer 213. The color filters CF1 through CF3 may include first color filters CF1, second color filters CF2, and third color filters CF3.

A first color filter CF1 located in the first subpixel SPX1 may transmit first light (light in the red wavelength band), and may absorb or block third light (light in the blue wavelength band). Therefore, the first color filter CF1 may transmit the first light (light in the red wavelength band) into which a portion of the third light (light in the blue wavelength band) emitted from a light-emitting element LE has been converted by the first light conversion layer QDL1, and may absorb or block the third light (light in the blue wavelength band) that has not been converted by the first light conversion layer QDL1. Accordingly, the first subpixel SPX1 may output the first light (light in the red wavelength band).

A second color filter CF2 located in the second subpixel SPX2 may transmit second light (light in the green wavelength band), and may absorb or block third light (light in the blue wavelength band). Therefore, the second color filter CF2 may transmit the second light (light in the green wavelength band) into which a portion of the third light (light in the blue wavelength band) emitted from a light-emitting element LE has been converted by the second light conversion layer QDL2, and may absorb or block the third light (light in the blue wavelength band) that has not been converted by the second light conversion layer QDL2. Accordingly, the second subpixel SPX2 may output the second light (light in the green wavelength band).

A third color filter CF3 located in the third subpixel SPX3 may transmit third light (light in the blue wavelength band). Therefore, the third color filter CF3 may transmit the third light (light in the blue wavelength band) that passes through the light transmission layer TPL after being emitted from a light-emitting element LE. Accordingly, the third subpixel SPX3 may emit the third light (light in the blue wavelength band).

The first color filter CF1, the second color filter CF2, and the third color filter CF3 overlapping each other in the third direction DR3 may overlap the light-blocking layer BM in the third direction DR3.

A sixth organic layer 214 for planarization may be located on the color filters CF1 through CF3.

The fifth organic layer 213 and the sixth organic layer 214 may be made of acryl resin, epoxy resin, phenolic resin, polyamide resin, or polyimide resin.

Figure 8:
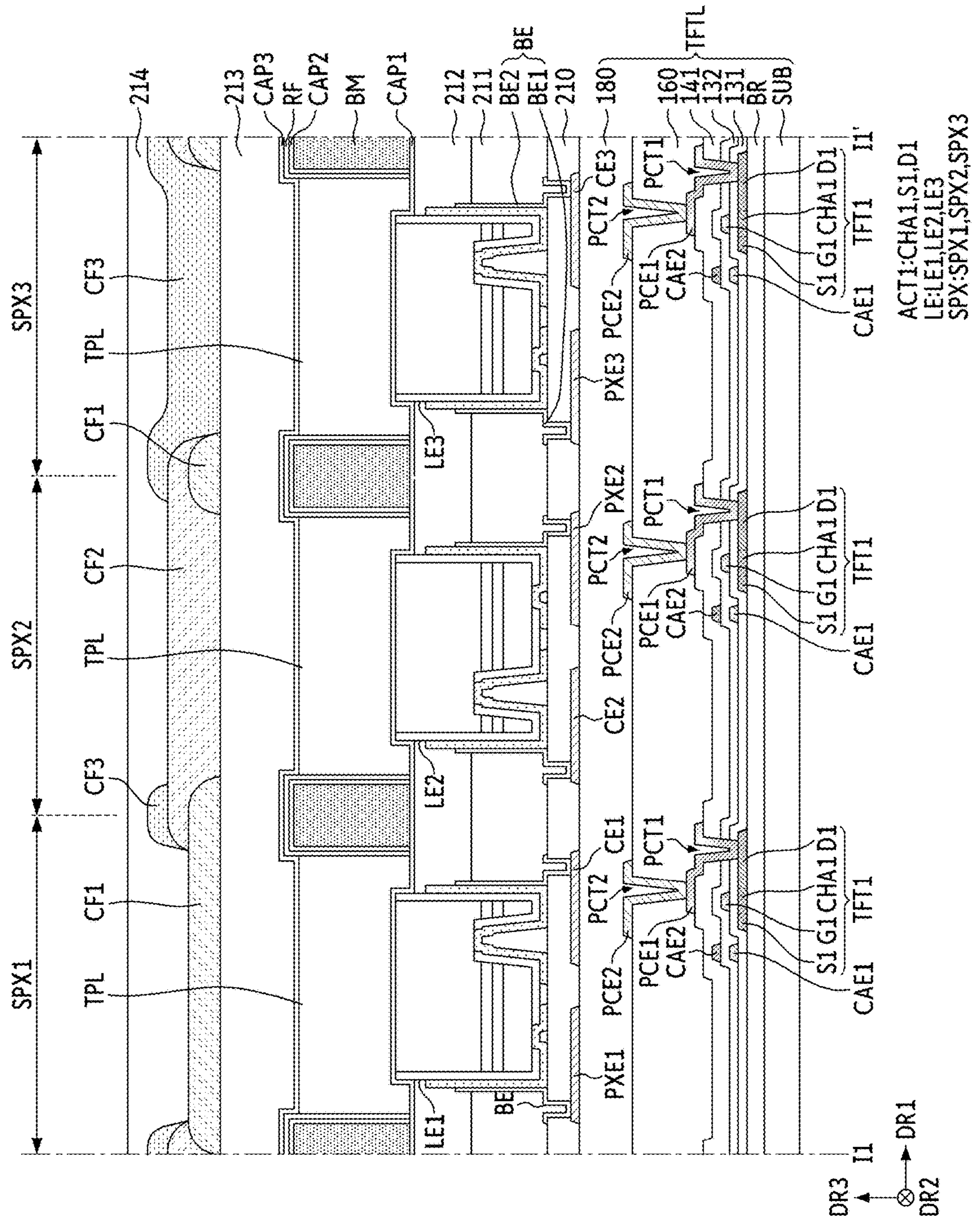
FIG. 8 is a cross-sectional view illustrating an example of a cross section of a display panel corresponding to line I1-I1' of FIG. 5.
Figure 9:
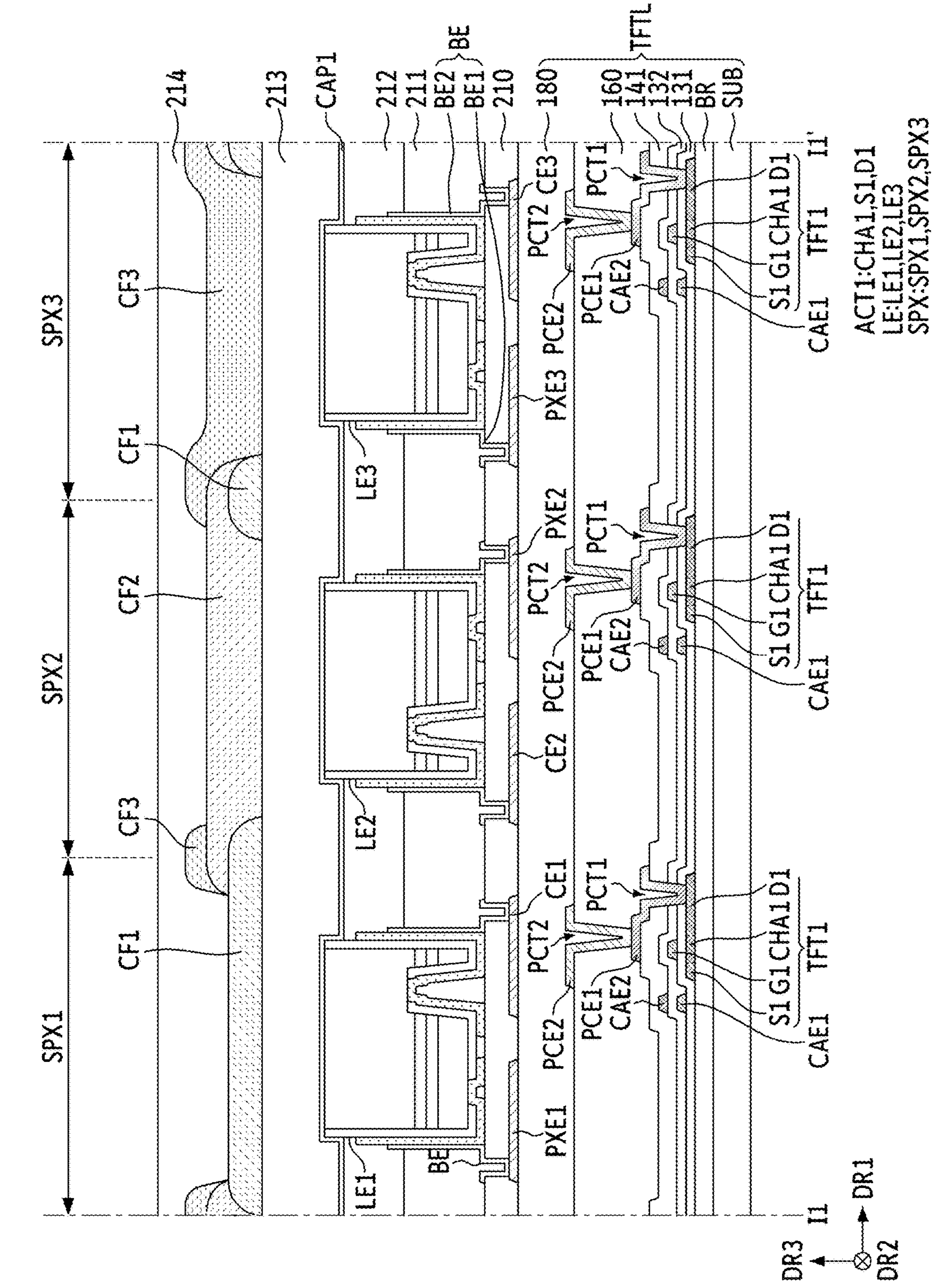
FIG. 9 is a cross-sectional view illustrating an example of a cross section of a display panel corresponding to line I1-I1' of FIG. 5.

FIG. 8 is a cross-sectional view illustrating an example of a cross section of a display panel 100 corresponding to line 11-11' of FIG. 5. FIG. 9 is a cross-sectional view illustrating an example of a cross section of a display panel 100 corresponding to line II-II' of FIG. 5. Compared with FIG. 6, FIGS. 8 and 9 show embodiments of a display panel 100 that does not include light conversion layers QDL1 and QDL2. In addition, FIGS. 8 and 9 show different embodiments in relation to a light-blocking layer BM and a light transmission layer TPL.

Referring to FIGS. 8 and 9, subpixels SPX may include light-emitting elements LE that emit light corresponding to their respective emission colors. For example, a first subpixel SPX1 may include at least one first light-emitting element LE1 that emits first light (e.g., red first light), a second subpixel SPX2 may include at least one second light-emitting element LE2 that emits second light (e.g., green second light), and a third subpixel SPX3 may include at least one third light-emitting element LE3 that emits third light (e.g., blue third light).

When the subpixels SPX include light-emitting elements LE that emit light corresponding to their respective emission colors, the light emitted from the light-emitting elements LE can be utilized more efficiently. For example, a decrease in the light efficiency of the subpixels SPX due to light conversion can be reduced or prevented. In addition, the color purity of light emitted from the subpixels SPX can be increased, and the color gamut of the subpixels SPX can be increased.

In one or more embodiments, each of the subpixels SPX may include a light transmission layer TPL. For example, as illustrated in FIG. 8, light transmission layers TPL of the subpixels SPX and a light-blocking layer BM surrounding the light transmission layers TPL may be located on a first capping layer CAP1.

The light-blocking layer BM may be located between and/or around emission areas of the subpixels SPX. The light-blocking layer BM may surround the light transmission layers TPL of the subpixels SPX.

The light-blocking layer BM may be a single layer or a multilayer. For example, the light-blocking layer BM may be a single layer or, as in one or more embodiments corresponding to FIG. 6, may be a multilayer including a first light-blocking layer BM1 and a second light-blocking layer BM2.

The light-blocking layer BM may include vertical side surfaces or, as in one or more embodiments corresponding to FIG. 6, may include inclined side surfaces. The shape, height, or structure of the light-blocking layer BM may vary according to embodiments.

In one or more embodiments, the display panel 100 may further include a second capping layer CAP2 and a reflective layer RF located on the light-blocking layer BM. For example, the second capping layer CAP2 and the reflective layer RF may be sequentially located on the light-blocking layer BM.

The second capping layer CAP2 may cover the light-blocking layer BM. For example, the second capping layer CAP2 may cover the side and upper surfaces of the light-blocking layer BM. The second capping layer CAP2 may be located only on the light-blocking layer BM or, as in one or more embodiments corresponding to FIG. 6, may be located in the entire display area DA.

The reflective layer RF may cover at least the side surfaces of the light-blocking layer BM. For example, the reflective layer RF may cover the side and upper surfaces of the light-blocking layer BM. The reflective layer RF may increase the amount of light emitted from the subpixels SPX, and may improve the light efficiency of the subpixels SPX.

A light transmission layer TPL may be located in the emission area of each subpixel SPX surrounded by the light-blocking layer BM and the reflective layer RF. The light transmission layer TPL may be covered with a third capping layer CAP3.

The light transmission layers TPL may be optically transparent, and may transmit light emitted from the light-emitting elements LE of the subpixels SPX. For example, the light transmission layers TPL may transmit the first light, the second light, and the third light respectively emitted from the first light-emitting element LE1, the second light-emitting element LE2, and the third light-emitting element LE3.

In one or more embodiments, the light transmission layers TPL may include a light scatterer (or a light diffuser), such as titanium dioxide ($TiO_2$) or silicon dioxide ($SiO_2$). For example, the light transmission layers TPL may include a base resin including a light transmitting material and light scatterers dispersed in the base resin. Accordingly, the light output efficiency of the subpixels SPX can be increased.

The third capping layer CAP3 may be located on the light transmission layers TPL. In one or more embodiments, the third capping layer CAP3 may be formed in the entire display area DA to entirely cover the light transmission layers TPL and the light-blocking layer BM. For example, the third capping layer CAP3 may be located on the light transmission layers TPL and the reflective layer RF. Alternatively, when the display panel 100 does not include the reflective layer RF, the third capping layer CAP3 may be located on the light transmission layers TPL and the second capping layer CAP2.

At least one overcoat layer and a color filter layer may be located on the third capping layer CAP3. For example, a fifth organic layer 213, color filters CF1 through CF3, and a sixth organic layer 214 may be located on the third capping layer CAP3.

In one or more embodiments, the subpixels SPX may not include the light transmission layers TPL. For example, as illustrated in FIG. 9, the display panel 100 may not include the light-blocking layer BM, the second capping layer CAP2, the reflective layer RF, the light transmission layers TPL, and the third capping layer CAP3 of FIG. 8, and the fifth organic layer 213, the color filters CF1 through CF3 and the sixth organic layer 214 may be located on the first capping layer CAP1 covering the light-emitting elements LE.

In one or more embodiments, even though the subpixels SPX do not include the light transmission layers TPL and/or the light conversion layers QDL1 and QDL2, the display panel 100 may include the light-blocking layer BM. For example, the display panel 100 may include the light-blocking layer BM, the second capping layer CAP2, and the reflective layer RF of FIG. 8 and may not include the light transmission layers TPL and the third capping layer CAP3. In this case, the fifth organic layer 213, the color filters CF1 through CF3, and the sixth organic layer 214 may be located on the first capping layer CAP1 and the reflective layer RF. When the display panel 100 does not include the reflective layer RF, the fifth organic layer 213, etc. may be directly located on the second capping layer CAP2.

Figure 10:
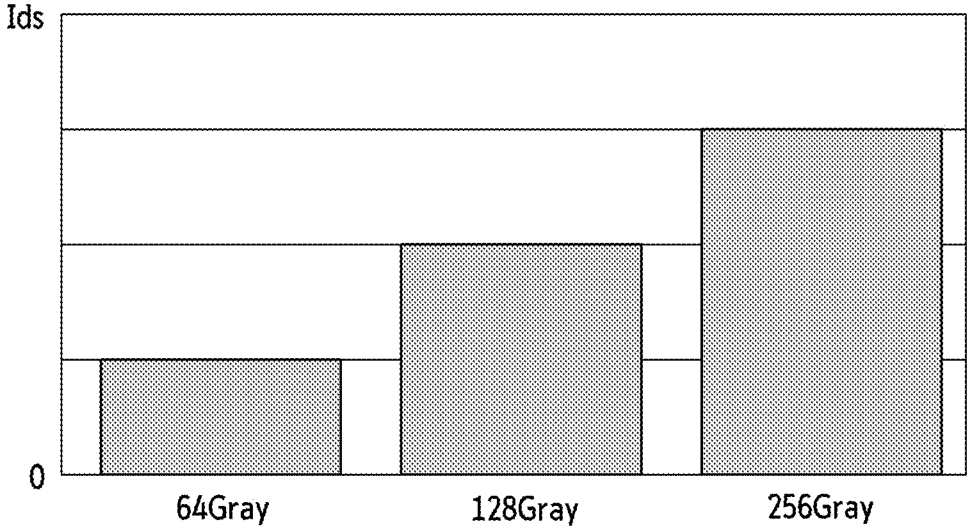
FIG. 10 is a graph illustrating a driving current of a subpixel for each gray level according to one or more embodiments.

FIG. 10 is a graph illustrating a driving current Ids of a subpixel SPX for each gray level according to one or more embodiments.

Referring to FIG. 10, the driving current Ids of a different magnitude may flow through the subpixel SPX according to the gray level to be expressed in the subpixel SPX during each emission period (e.g., an emission period corresponding to an on-duty ratio in one driving cycle, such as one frame or one horizontal period, of a pixel PX). For example, the data driver 252 of FIG. 3 may output a data voltage, which corresponds to a gray level to be expressed in each subpixel SPX, in response to the video data DATA of each frame. Accordingly, the driving current Ids of a magnitude corresponding to the data voltage may flow during an emission period of the subpixel SPX (e.g., an on-duty period during which an emission control signal of a gate-on voltage is supplied to the subpixel SPX in one driving cycle of the subpixel SPX or the pixel PX).

In one or more embodiments, the display device 10 may control the luminance of the subpixel SPX using a pulse-amplitude modulation (PAM) method. For example, an on-duty ratio of the subpixel SPX may be maintained to be substantially constant by supplying an emission control signal having a substantially uniform pulse width to the subpixel SPX regardless of the gray level to be expressed in the subpixel SPX. In addition, the luminance of the subpixel SPX may be controlled by changing or controlling a data voltage and the magnitude of the driving current Ids corresponding to the data voltage according to the gray level to be expressed in the subpixel SPX.

For example, the driving current Ids of the subpixel SPX corresponding to a gray level of 128 may be greater than the driving current Ids of the subpixel SPX corresponding to a gray level of 64, and may be less than the driving current Ids of the subpixel SPX corresponding to a gray level of 256. In the graph of FIG. 10, the driving current Ids of the subpixel SPX increases linearly with respect to the gray level, but embodiments are not limited thereto. For example, the magnitude of the driving current Ids for each gray level may be appropriately adjusted according to the emission characteristics of a light-emitting element LE and a subpixel SPX including the light-emitting element LE.

Figure 11:
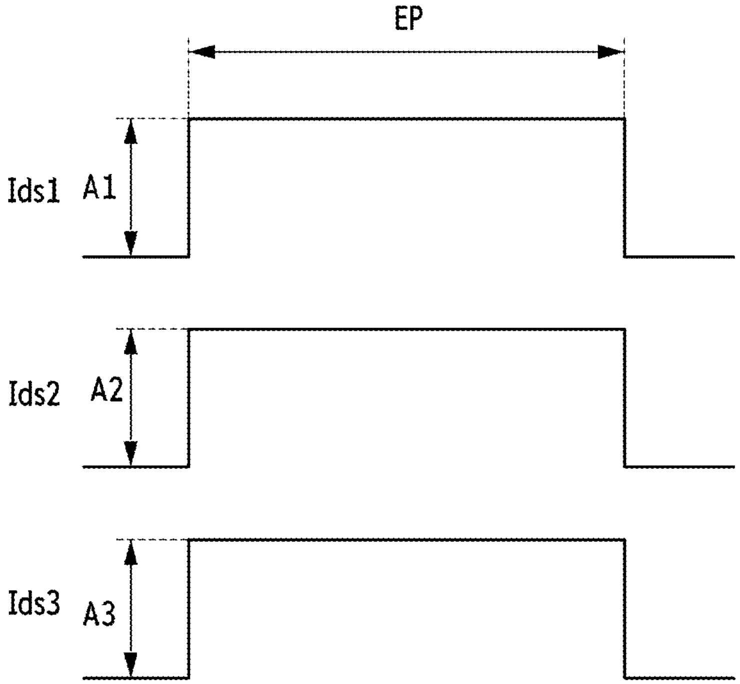
FIG. 11 is a waveform diagram of driving currents of subpixels according to one or more embodiments.

FIG. 11 is a waveform diagram of driving currents of subpixels according to one or more embodiments. For example, FIG. 11 roughly shows a first driving current Ids1, a second driving current Ids2, and a third driving current Ids3 flowing through a first subpixel SPX1, a second subpixel SPX2, and a third subpixel SPX3 of a pixel PX during an emission period EP belonging to one driving cycle of the pixel PX.

Referring to FIGS. 3 and 11, the first subpixel SPX1, the second subpixel SPX2, and the third subpixel SPX3 of one pixel PX may be connected to the same emission control line EL, and may emit light substantially simultaneously. For example, subpixels SPX of pixels PX located on each horizontal line (e.g., each row) of the display area DA may be commonly connected to an emission control line EL located on the horizontal line, and may emit light substantially simultaneously in response to an emission control signal of a gate-on voltage supplied to the emission control line EL.

In one or more embodiments, the subpixels SPX may be driven with a substantially uniform driving current Ids in response to each gray level of the video data DATA. For example, the data driver 252 may supply a uniform data voltage to the subpixels SPX in response to each gray level of the video data DATA.

To drive each of the first subpixel SPX1, the second subpixel SPX2, and the third subpixel SPX3 at a luminance corresponding to a highest gray level during the emission period EP of a pixel PX, the data driver 252 may supply a data voltage corresponding to the highest gray level to each of the first subpixel SPX1, the second subpixel SPX2, and the third subpixel SPX3. When the subpixels SPX are driven with a uniform driving current Ids, a uniform first driving current Ids1, second driving current Ids2, and third driving current Ids3 may flow through the first subpixel SPX1, the second subpixel SPX2, and the third subpixel SPX3 during the emission period EP that follows after a data voltage is input to each of the subpixels SPX. For example, amplitudes A1, A2, and A3 of the first driving current Ids1, the second driving current Ids2, and the third driving current Ids3 flowing through the first subpixel SPX1, the second subpixel SPX2, and the third subpixel SPX3 during the emission period EP of the pixel PX in response to the data voltage of the highest gray level may be substantially the same.

When the subpixels SPX are driven at different respective gray levels, they may be driven with different respective driving currents Ids. For example, when data voltages corresponding to different gray levels are supplied to the first subpixel SPX1, the second subpixel SPX2, and the third subpixel SPX3, the amplitudes A1, A2, and A3 of the first driving current Ids1, the second driving current Ids2, and the third driving current Ids3 flowing through the first subpixel SPX1, the second subpixel SPX2, and the third subpixel SPX3 during the emission period EP of the pixel PX may be different.

However, embodiments are not limited thereto. For example, the first driving current Ids1, the second driving current Ids2, and the third driving current Ids3 may be appropriately adjusted or differentiated in consideration of the emission characteristics or difference in efficiency of the subpixels SPX, in addition to the video data DATA.

To display an image with substantially uniform image quality in the display area DA, the subpixels SPX must be driven with a uniform driving current Ids and/or luminance in response to each data voltage (e.g., a data voltage supplied to each subpixel SPX according to each gray level of the video data DATA). However, when the subpixels SPX of each pixel PX are driven concurrently or substantially simultaneously, the driving current Ids and/or luminance of the subpixels SPX may change due to signal interference between the subpixels SPX.

For example, because the subpixels SPX of each horizontal line are simultaneously driven by the same emission control signal, the luminance of at least one subpixel SPX and a pixel PX including the subpixel SPX may deteriorate due to crosstalk that occurs in the thin-film transistor layer TFTL, etc. For example, even if data voltages corresponding to luminances of about 250 nits, about 650 nits, and about 100 nits are respectively supplied to the first subpixel SPX1, the second subpixel SPX2, and third subpixel SPX3 of one pixel PX, the pixel PX may not emit light at a target luminance (e.g., about 1000 nits corresponding to the sum of about 250 nits, about 650 nits, and about 100 nits), and may emit light at a low luminance of about about 600 nits.

Figure 12:
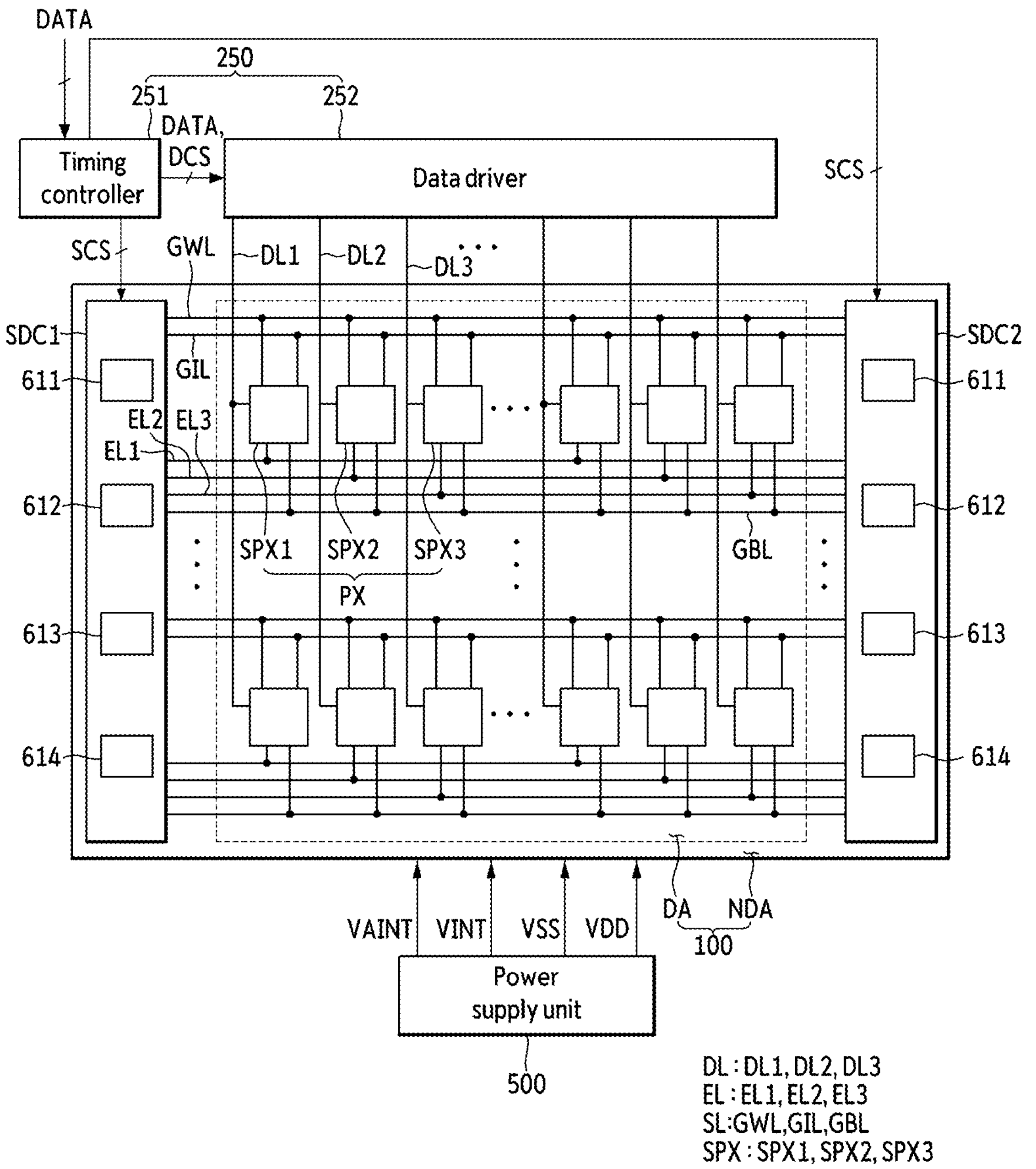
FIG. 12 is a block diagram of a display device according to one or more embodiments.

FIG. 12 is a block diagram of a display device according to one or more embodiments. The one or more embodiments corresponding to FIG. 12 is different from one or more embodiments corresponding to FIG. 3 in that a first subpixel SPX1, a second subpixel SPX2, and a third subpixel SPX3 of each pixel PX are connected to different emission control lines EL.

Referring to FIG. 12, a display panel 100 may include a plurality of emission control lines EL located on each horizontal line of a display area DA and respectively connected to different subpixels SPX. For example, on each horizontal line of the display area DA, a first emission control line EL1 connected to first subpixels SPX1 of the horizontal line, a second emission control line EL2 connected to second subpixels SPX2 of the horizontal line, and a third emission control line EL3 connected to third subpixels SPX3 of the horizontal line may be located. The first emission control line EL1, the second emission control line EL2, and the third emission control line EL3 may be separated from each other, and may receive their respective emission control signals.

In one or more embodiments, the first subpixel SPX1, the second subpixel SPX2, and the third subpixel SPX3 of each pixel PX may be located on the same horizontal line in the display area DA where the pixel PX is located, and may be connected to different emission control lines EL. Because the first subpixel SPX1, the second subpixel SPX2, and the third subpixel SPX3 of each pixel PX are connected to different emission control lines EL, emission control signals supplied to the first subpixel SPX1, the second subpixel SPX2, and the third subpixel SPX3 can be individually and/or independently controlled or changed. Accordingly, emission periods or on-duty ratios of the first subpixel SPX1, the second subpixel SPX2, and the third subpixel SPX3 included in each pixel PX can be individually and/or independently controlled.

Figure 13:
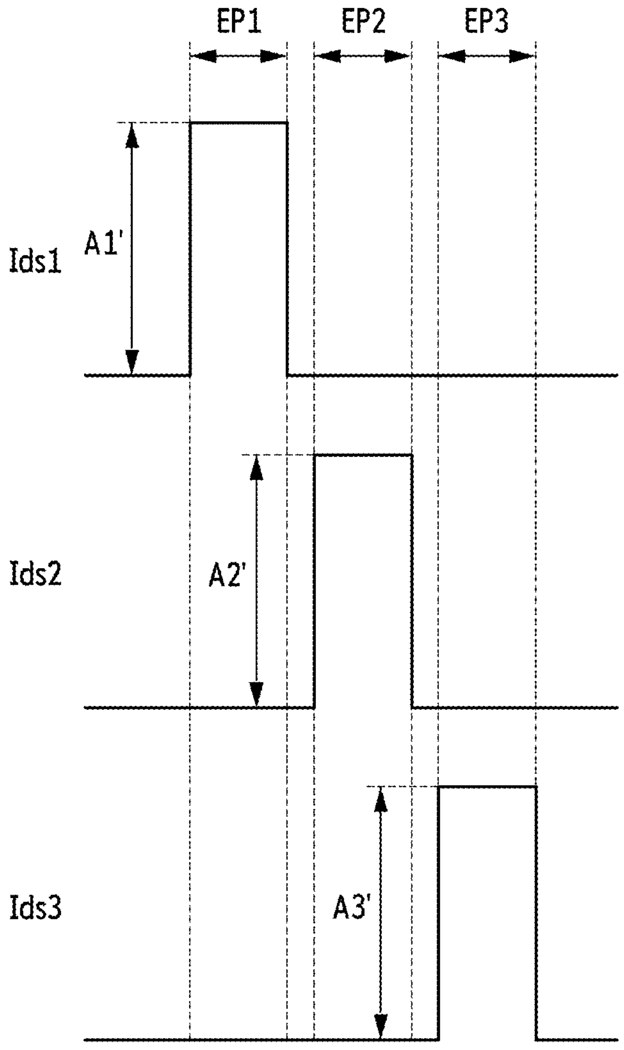
FIG. 13 is a waveform diagram of driving currents of subpixels according to one or more embodiments.
Figure 14:
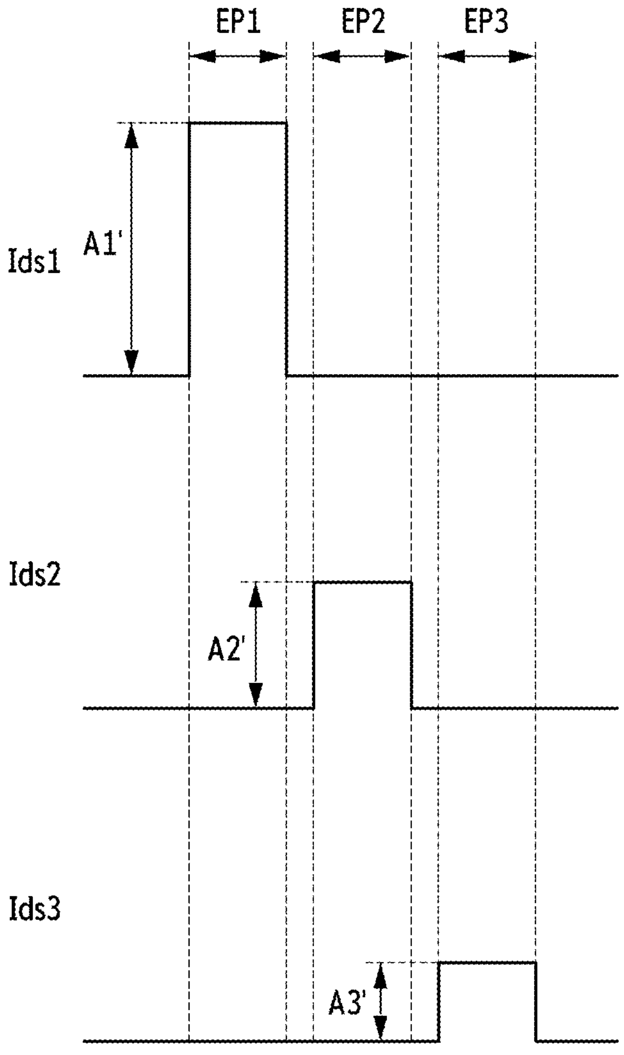
FIG. 14 is a waveform diagram of driving currents of subpixels according to one or more embodiments.

FIG. 13 is a waveform diagram of driving currents of subpixels according to one or more embodiments. FIG. 14 is a waveform diagram of driving currents of subpixels according to one or more embodiments. For example, FIGS. 13 and 14 roughly show a first driving current Ids1, a second driving current Ids2, and a third driving current Ids3 respectively flowing through a first subpixel SPX1, a second subpixel SPX2, and a third subpixel SPX3 of a pixel PX during emission periods EP1 through EP3 of one driving cycle of the pixel PX.

Figure 15:
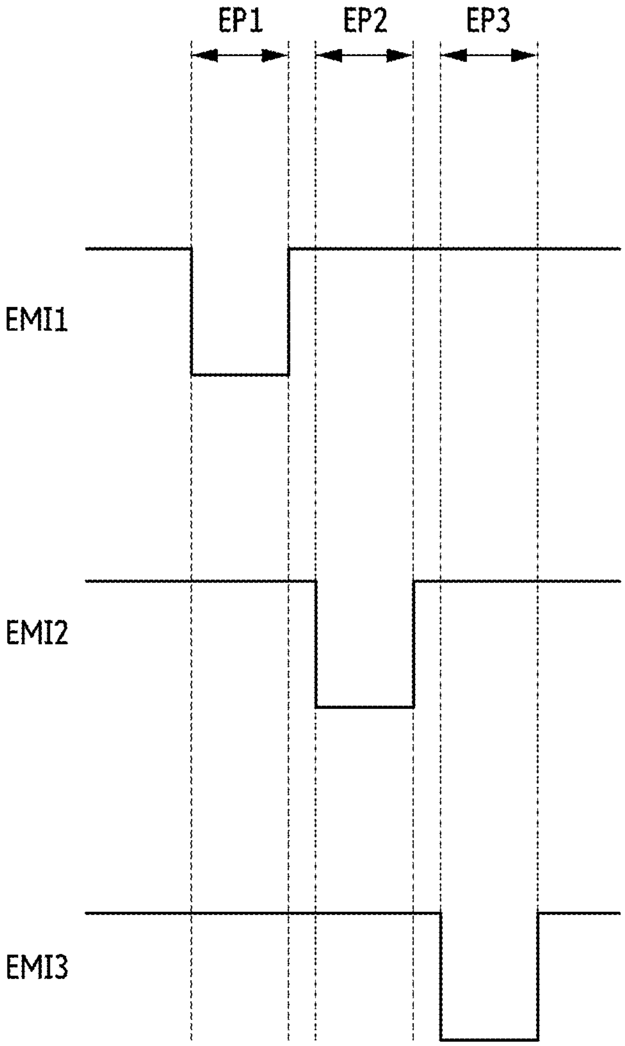
FIG. 15 is a waveform diagram of emission control signals according to one or more embodiments.

FIG. 15 is a waveform diagram of emission control signals according to one or more embodiments. For example, FIG. 15 shows approximate waveforms of a first emission control signal EMI1, a second emission control signal EMI2, and a third emission control signal EMI3 supplied to a first emission control line EL1, a second emission control line EL2, and a third emission control line EL3 during emission periods EP1 through EP3 of a pixel PX.

Referring to FIGS. 13 through 15 in conjunction with FIG. 12, the first subpixel SPX1, the second subpixel SPX2, and the third subpixel SPX3 of a pixel PX may be driven with the driving currents Ids1, Ids2, and Ids3 corresponding to data voltages during the emission periods EP1, EP2, and EP3, respectively.

For example, the first subpixel SPX1 may emit light in response to the first emission control signal EMI1 input to the first emission control line EL1 during a first emission period EP1. During the first emission period EP1, the first driving current Ids1 corresponding to a data voltage input to a first data line DL1 may flow through the first subpixel SPX1. For example, a pixel circuit of the first subpixel SPX1 (e.g., a pixel circuit including the driving transistor DT, the switch elements, and the capacitor C1 of FIG. 4) may receive a first data voltage from the first data line DL1 during one driving cycle of the pixel PX in response to a write scan signal supplied before the emission control signals EMI1 through EMI3. In addition, the pixel circuit of the first subpixel SPX1 may supply the first driving current Ids1 corresponding to the first data voltage to a light-emitting element LE of the first subpixel SPX1 in response to the first emission control signal EMI1 supplied during the first emission period EP1 in one driving cycle of the pixel PX. Accordingly, the first subpixel SPX1 may emit light with a luminance corresponding to the first driving current Ids1 during the first emission period EP1.

The second subpixel SPX2 may emit light in response to the second emission control signal EMI2 input to the second emission control line EL2 during a second emission period EP2. During the second emission period EP2, the second driving current Ids2 corresponding to a data voltage input to a second data line DL2 may flow through the second subpixel SPX2. For example, a pixel circuit of the second subpixel SPX2 (e.g., a pixel circuit including the driving transistor DT, the switch elements and the capacitor C1 of FIG. 4) may receive a second data voltage from the second data line DL2 during one driving cycle of the pixel PX in response to a write scan signal supplied before the emission control signals EMI1 through EMI3. In addition, the pixel circuit of the second subpixel SPX2 may supply the second driving current Ids2 corresponding to the second data voltage to a light-emitting element LE of the second subpixel SPX2 in response to the second emission control signal EMI2 supplied during the second emission period EP2 in one driving cycle of the pixel PX. Accordingly, the second subpixel SPX2 may emit light with a luminance corresponding to the second driving current Ids2 during the second emission period EP2.

The third subpixel SPX3 may emit light in response to the third emission control signal EMI3 input to the third emission control line EL3 during a third emission period EP3. During the third emission period EP3, the third driving current Ids3 corresponding to a data voltage input to a third data line DL3 may flow through the third subpixel SPX3. For example, a pixel circuit of the third subpixel SPX3 (e.g., a pixel circuit including the driving transistor DT, the switch elements and the capacitor C1 of FIG. 4) may receive a third data voltage from the third data line DL3 during one driving cycle of the pixel PX in response to a write scan signal supplied before the emission control signals EMI1 through EMI3. In addition, the pixel circuit of the third subpixel SPX3 may supply the third driving current Ids3 corresponding to the third data voltage to a light-emitting element LE of the third subpixel SPX3 in response to the third emission control signal EMI3 supplied during the third emission period EP3 in one driving cycle of the pixel PX. Accordingly, the third subpixel SPX3 may emit light with a luminance corresponding to the third driving current Ids3 during the third emission period EP3.

In one or more embodiments, the first subpixel SPX1, the second subpixel SPX2, and the third subpixel SPX3 may be respectively driven with a uniform driving current Ids1, Ids2, and Ids3 corresponding to each gray level. For example, a data driver 252 may supply a substantially uniform data voltage to the first subpixel SPX1, the second subpixel SPX2, and the third subpixel SPX3 in response to each gray level of the video data DATA. Accordingly, a uniform first driving current Ids1, second driving current Ids2, and third driving current Ids3 may flow through the first subpixel SPX1, the second subpixel SPX2, and the third subpixel SPX3. For example, when data voltages of the same gray level (e.g., the first data voltage of gray level 256, the second data voltage of gray level 256, and the third data voltage of gray level 256) are input to the first subpixel SPX1, the second subpixel SPX2, and the third subpixel SPX3, amplitudes A1', A2', and A3' of the first driving current Ids1, the second driving current Ids2, and the third driving current Ids3 may be substantially equal to each other as illustrated in FIG. 13.

On the other hand, when data voltages of different gray levels are input to the first subpixel SPX1, the second subpixel SPX2, and the third subpixel SPX3, the amplitudes A1', A2', and A3' of the first driving current Ids1, the second driving current Ids2, and the third driving current Ids3 may be different from each other as illustrated in FIG. 14. For example, the amplitudes A1', A2', and A3' of the first driving current Ids1, the second driving current Ids2, and the third driving current Ids3 may correspond (e.g., be proportional) to each gray level of the video data DATA or the magnitude of a data voltage corresponding to each gray level. For example, when the first data voltage of gray level 256, the second data voltage of gray level 128, and the third data voltage of gray level 64 are input to the first subpixel SPX1, the second subpixel SPX2, and the third subpixel SPX3, respectively, the amplitude A2' of the second driving current Ids2 flowing through the second subpixel SPX2 during the second emission period EP2 may be less than the amplitude A1' of the first driving current Ids1 flowing through the first subpixel SPX1 during the first emission period EP1, and may be greater than the amplitude A3' of the third driving current Ids3 flowing through the third subpixel SPX3 during the third emission period EP3.

In one or more embodiments, when the first data voltage of gray level 256, the second data voltage of gray level 128, and the third data voltage of gray level 64 are input to the first subpixel SPX1, the second subpixel SPX2, and the third subpixel SPX3, respectively, the amplitude A2' of the second driving current Ids2 may correspond to about ½ of the amplitude A1' of the first driving current Ids1, and the amplitude A3' of the third driving current Ids3 may correspond to about ¼ of the amplitude A1' of the first driving current Ids1.

However, embodiments are not limited thereto. For example, the driving currents Ids1, Ids2, and Ids3 flowing through subpixels SPX can be appropriately adjusted or changed according to the emission characteristics of light-emitting elements LE and the subpixels SPX including the light-emitting elements LE.

In one or more embodiments, the first subpixel SPX1, the second subpixel SPX2, and the third subpixel SPX3 may be driven in different emission periods EP1, EP2, and EP3 during one driving cycle of each pixel PX (e.g., one driving cycle including a data write period in which a write scan signal is input and an emission period EP1 through EP3 in which the emission control signals EMI1 through EMI3 are input). For example, the emission period EP1 through EP3 of each pixel PX may be divided into the first emission period EP1, the second emission period EP2, and the third emission period EP3, and the first subpixel SPX1, the second subpixel SPX2, and the third subpixel SPX3 may be driven in a time-division manner, for example, may be made to emit light in a time-division manner.

In one or more embodiments, the emission periods EP1, EP2, and EP3 of the first subpixel SPX1, the second subpixel SPX2, and the third subpixel SPX3 may be controlled by the first emission control signal EMI1, the second emission control signal EMI2, and the third emission control signal EMI3, respectively. For example, an emission control signal output unit 614 may sequentially output the first emission control signal EMI1, the second emission control signal EMI2, and the third emission control signal EMI3 of a gate-on voltage to the first emission control line EL1, the second emission control line EL2, and the third emission control line EL3 during the first emission period EP1, the second emission period EP2, and the third emission period EP3, respectively. Accordingly, the first subpixel SPX1, the second subpixel SPX2, and the third subpixel SPX3 may sequentially emit light.

In one or more embodiments, durations of the emission periods EP1, EP2, and EP3 of the first subpixel SPX1, the second subpixel SPX2, and the third subpixel SPX3 may be substantially equal or uniform. For example, the emission period EP1 through EP3 of each pixel PX may be equally divided into the first emission period EP1, the second emission period EP2, and the third emission period EP3. In this case, on-duty ratios of the first subpixel SPX1, the second subpixel SPX2, and the third subpixel SPX3 may be equal to each other. In addition, the on-duty ratio of each of the first subpixel SPX1, the second subpixel SPX2, and the third subpixel SPX3 may be about ⅓ of an on-duty ratio of a pixel PX.

In one or more embodiments, when a maximum on-duty ratio of a pixel PX that can be secured within one driving cycle is about 97%, the on-duty ratio of each of the first subpixel SPX1, the second subpixel SPX2, and the third subpixel SPX3 may be set to about 32%. Accordingly, the on-duty ratio of the pixel PX may be set to about 96%.

The emission control signal output unit 614 may output the first emission control signal EMI1, the second emission control signal EMI2, and the third emission control signal EMI3, which have pulse widths corresponding to the on-duty ratios of the first subpixel SPX1, the second subpixel SPX2, and the third subpixel SPX3, to the first emission control line EL1, the second emission control line EL2, and the third emission control line EL3, respectively. For example, the emission control signal output unit 614 may output the first emission control signal EMI1, the second emission control signal EMI2, and the third emission control signal EMI3 during the first emission period EP1, the second emission period EP2, and the third emission period EP3, respectively, in the emission period EP1 through EP3 included in one driving cycle of a pixel PX.

In one or more embodiments, the first emission period EP1, the second emission period EP2, and the third emission period EP3 may not overlap each other in time. In addition, there may be a time difference between the first emission period EP1, the second emission period EP2, and the third emission period EP3. For example, the first emission period EP1, the second emission period EP2, and the third emission period EP3 may be completely separated from each other with a blank period (e.g., a non-emission period excluding the first emission period EP1, the second emission period EP2, and the third emission period EP3 in one driving cycle of a pixel PX) interposed between them. In one or more embodiments, each blank period located between the first emission period EP1, the second emission period EP2, and the third emission period EP3 during one driving cycle of a pixel PX may correspond to a period corresponding to approximately one-third of an off-duty ratio of the pixel PX (e.g., a ratio obtained by subtracting an on-duty ratio of the pixel PX from 100%).

In one or more embodiments, because the subpixels SPX are driven in a time-division manner, when the on-duty ratio of each of the subpixels SPX decreases compared with the on-duty ratio of each of the subpixels SPX according to one or more embodiments corresponding to FIGS. 3 and 11, the driving current Ids1, Ids2, or Ids3 of each of the subpixels SPX may be increased to compensate for a decrease in luminance due to the decrease in the on-duty ratio of each of the subpixels SPX. For example, when the on-duty ratio of each of the subpixels SPX is reduced by 1/N times, the driving current Ids1, Ids2, or Ids3 of each of the subpixels SPX corresponding to each gray level may be increased by N times, so that emission luminances of the subpixels SPX corresponding to each gray level can be appropriately or uniformly maintained. For example, when the on-duty ratio of each of the subpixels SPX is reduced by about ⅓ times, the amplitude A1', A2', or A3' of the driving current Ids1, Ids2, or Ids3 of each of the subpixels SPX corresponding to each gray level may be increased by about three times, so that the emission luminances of the subpixels SPX corresponding to each gray level can be appropriately or uniformly maintained. In one or more embodiments, the data driver 252 may output data voltages (e.g., the first data voltage, the second data voltage, and the third data voltage) of magnitudes corresponding to the amplitudes A1' through A3' of the driving currents Ids1 through Ids3, which respectively correspond to the subpixels SPX, to the first data line DL1, the second data line DL2, and the third data line DL3, respectively.

The pixel circuits of the first subpixel SPX1, the second subpixel SPX2, and the third subpixel SPX3 may respectively generate the driving currents Ids1, Ids2, and Ids3 in response to data voltages input through their respective data lines DL. For example, the pixel circuit of the first subpixel SPX1 may generate the first driving current Ids1 having a magnitude corresponding to the first data voltage input through the first data line DL1. The pixel circuit of the second subpixel SPX2 may generate the second driving current Ids2 having a magnitude corresponding to the second data voltage input through the second data line DL2. The pixel circuit of the third subpixel SPX3 may generate the third driving current Ids3 having a magnitude corresponding to the third data voltage input through the third data line DL3.

In addition, the pixel circuits of the first subpixel SPX1, the second subpixel SPX2, and the third subpixel SPX3 may respectively supply the driving currents Ids1 through Ids3 to the light-emitting elements LE during the emission periods EP1 through EP3 corresponding to the emission control signals EMI1 through EMI3, respectively. For example, the pixel circuit of the first subpixel SPX1 may supply the first driving current Ids1 to a light-emitting element LE during the first emission period EP1 in response to the first emission control signal EMI1 input through the first emission control line EL1. Because the first driving current Ids1 flows through the light-emitting element LE of the first subpixel SPX1 during the first emission period EP1, the light-emitting element LE of the first subpixel SPX1 may emit light with a luminance corresponding to the first driving current Ids1. The pixel circuit of the second subpixel SPX2 may supply the second driving current Ids2 to a light-emitting element LE during the second emission period EP2 in response to the second emission control signal EMI2 input through the second emission control line EL2. Because the second driving current Ids2 flows through the light-emitting element LE of the second subpixel SPX2 during the second emission period EP2, the light-emitting element LE of the second subpixel SPX2 may emit light with a luminance corresponding to the second driving current Ids2. The pixel circuit of the third subpixel SPX3 may supply the third driving current Ids3 to a light-emitting element LE during the third emission period EP3 in response to the third emission control signal EMI3 input through the third emission control line EL3. Because the third driving current Ids3 flows through the light-emitting element LE of the third subpixel SPX3 during the third emission period EP3, the light-emitting element LE of the third subpixel SPX3 may emit light with a luminance corresponding to the third driving current Ids3.

According to the above-described embodiments, the emission periods EP1, EP2, and EP3 of the first subpixel SPX1, the second subpixel SPX2, and the third subpixel SPX3 may be different from each other. For example, the emission periods EP1, EP2, and EP3 of the first subpixel SPX1, the second subpixel SPX2, and the third subpixel SPX3 may be separated from each other in time. For example, the first emission period EP1, the second emission period EP2, and the third emission period EP3 of the first subpixel SPX1, the second subpixel SPX2, and the third subpixel SPX3 may be completely separated so that they do not overlap each other. According to embodiments, it is possible to prevent or reduce a change in the driving current Ids and/or luminance of the subpixels SPX due to signal interference, etc.

Figure 16:
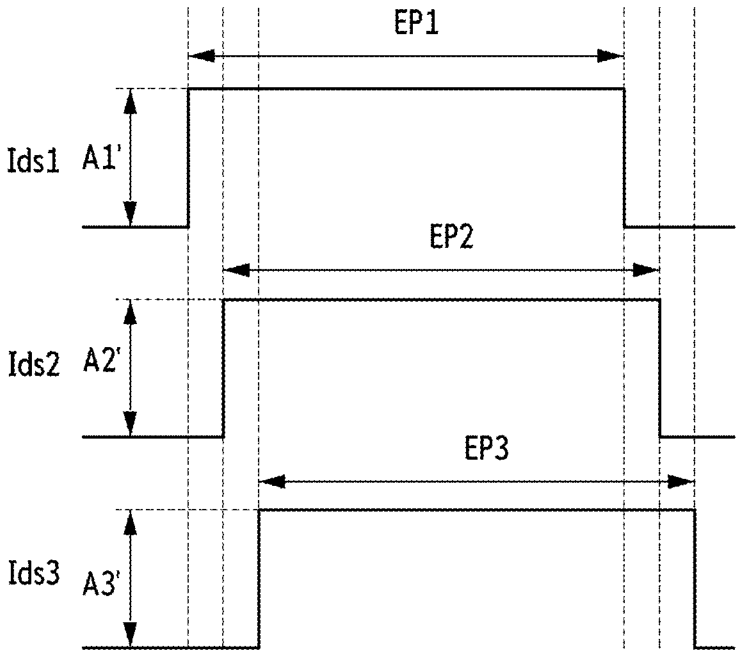
FIG. 16 is a waveform diagram of driving currents of subpixels according to one or more embodiments.
Figure 17:
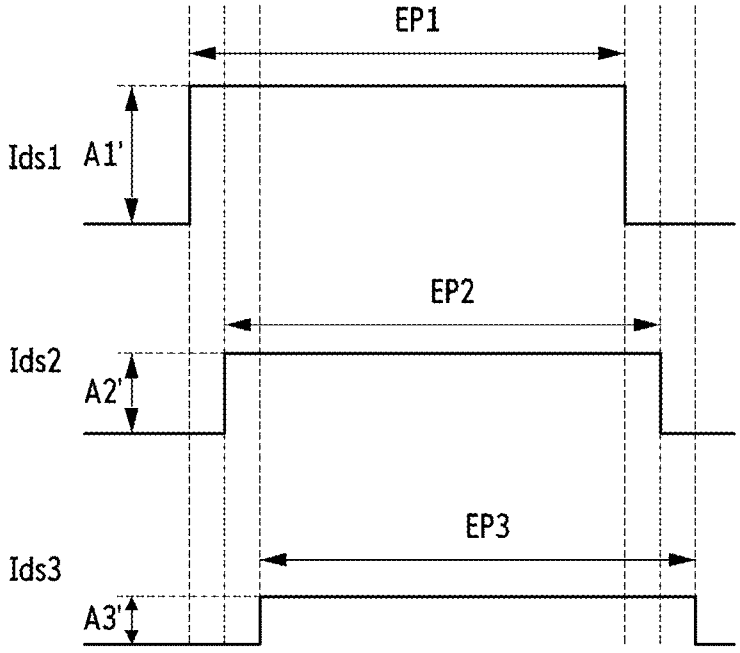
FIG. 17 is a waveform diagram of driving currents of subpixels according to one or more embodiments.

FIG. 16 is a waveform diagram of driving currents of subpixels according to one or more embodiments. FIG. 17 is a waveform diagram of driving currents of subpixels according to one or more embodiments. For example, FIGS. 16 and 17 roughly show a first driving current Ids1, a second driving current Ids2, and a third driving current Ids3 flowing through a first subpixel SPX1, a second subpixel SPX2, and a third subpixel SPX3 of a pixel PX during emission periods EP1 through EP3 of one driving cycle of the pixel PX.

Figure 18:
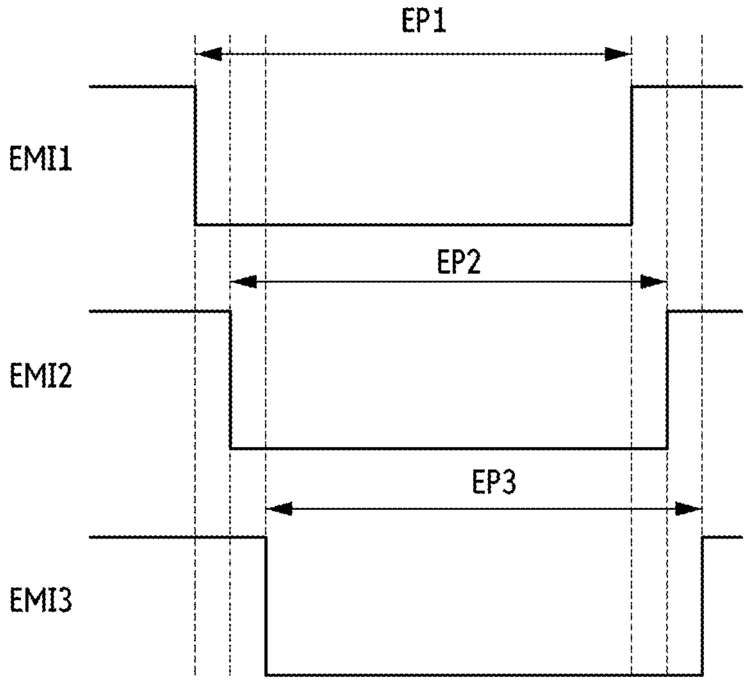
FIG. 18 is a waveform diagram of emission control signals according to one or more embodiments.

FIG. 18 is a waveform diagram of emission control signals according to one or more embodiments. For example, FIG. 18 shows approximate waveforms of a first emission control signal EMI1, a second emission control signal EMI2, and a third emission control signal EMI3 supplied to a first emission control line EL1, a second emission control line EL2, and a third emission control line EL3 during emission periods EP1 through EP3 of a pixel PX.

Referring to FIGS. 16 through 18 in conjunction with FIG. 12, the emission periods EP1, EP2, and EP3 of the first subpixel SPX1, the second subpixel SPX2, and the third subpixel SPX3 may partially overlap each other. For example, a first emission period EP1, a second emission period EP2, and a third emission period EP3 may be wider than those of the embodiments corresponding to FIGS. 13 through 15, and may partially overlap each other.

However, start times (for example, the respective start timings) of the first emission period EP1, the second emission period EP2, and the third emission period EP3 may be different from each other. In addition, or alternatively, end times (for example, the respective end timings) of the first emission period EP1, the second emission period EP2, and the third emission period EP3 may be different from each other. For example, the first emission period EP1, the second emission period EP2, and the third emission period EP3 may be arranged within one emission period EP1 through EP3 of a pixel PX in a form in which they are sequentially delayed or shifted by a period of time that is shorter than the duration of each of the first emission period EP1, the second emission period EP2, and the third emission period EP3.

For example, rising times of the first driving current Ids1, the second driving current Ids2, and the third driving current Ids3 may not overlap each other. In addition, falling times of the first driving current Ids1, the second driving current Ids2, and the third driving current Ids3 may not overlap each other.

Similarly, falling times of the first emission control signal EMI1, the second emission control signal EMI2, and the third emission control signal EMI3 may not overlap each other. In addition, rising times of the first emission control signal EMI1, the second emission control signal EMI2, and the third emission control signal EMI3 may not overlap each other.

FIG. 18 illustrates one or more embodiments in which a gate-on voltage of each of the first emission control signal EMI1, the second emission control signal EMI2, and the third emission control signal EMI3 is a low-level voltage that can turn on the fifth and sixth transistors ST5 and ST6 of FIG. 4. However, embodiments are not limited thereto. For example, a gate-on voltage and a gate-off voltage of each of the first emission control signal EMI1, the second emission control signal EMI2, and the third emission control signal EMI3 may change according to the type of switch elements controlled by the first emission control signal EMI1, the second emission control signal EMI2, and the third emission control signal EMI3. For example, when the fifth and sixth transistors ST5 and ST6 of FIG. 4 are changed to N-type transistors, the gate-on voltage of each of the first emission control signal EMI1, the second emission control signal EMI2, and the third emission control signal EMI3 may be a high-level voltage, and the gate-off voltage may be a low-level voltage.

In one or more embodiments, when data voltages of the same gray level (e.g., gray level 256) are input to the first subpixel SPX1, the second subpixel SPX2, and the third subpixel SPX3, amplitudes A1', A2', and A3' of the first driving current Ids1, the second driving current Ids2, and the third driving current Ids3 may be substantially equal to each other as illustrated in FIG. 16. On the other hand, when data voltages of different gray levels are input to the first subpixel SPX1, the second subpixel SPX2, and the third subpixel SPX3, the amplitudes A1', A2', and A3' of the first driving current Ids1, the second driving current Ids2, and the third driving current Ids3 may be different as illustrated in FIG. 17. In one or more embodiments, the amplitudes A1', A2', and A3' of the first driving current Ids1, the second driving current Ids2, and the third driving current Ids3 may be proportional to each gray level or data voltage, but embodiments are not limited thereto.

In one or more embodiments, when the first emission period EP1, the second emission period EP2, and the third emission period EP3 partially overlap each other as in the embodiments corresponding to FIGS. 16 through 18, lengths (e.g., durations) of the first emission period EP1, the second emission period EP2, and the third emission period EP3 may be greater than those in one or more embodiments in which the first emission period EP1, the second emission period EP2, and the third emission period EP3 do not overlap each other as in the embodiments corresponding to FIG. 13 through 15. For example, the duration of each of the first emission period EP1, the second emission period EP2, and the third emission period EP3 of FIGS. 16 through 18 may be substantially equal or similar to the duration of the emission period EP of FIG. 11. In this case, the amplitudes A1', A2', and A3' of the first driving current Ids1, the second driving current Ids2, and the third driving current Ids3 of FIGS. 16 and 17 may be substantially equal or similar to the amplitudes A1, A2, and A3 of the first driving current Ids1, the second driving current Ids2, and the third driving current Ids3 of FIG. 11.

In one or more embodiments, when each of the first emission period EP1, the second emission period EP2, and the third emission period EP3 of FIGS. 16 through 18 is shorter than the emission period EP of FIG. 11, the amplitudes A1', A2', and A3' of the first driving current Ids1, the second driving current Ids2, and the third driving current Ids3 of FIGS. 16 and 17 may be greater than the amplitudes A1, A2, and A3 of the first driving current Ids1, the second driving current Ids2, and the third driving current Ids3 of FIG. 11. For example, the amplitudes A1', A2', and A3' of the first driving current Ids1, the second driving current Ids2, and the third driving current Ids3 of FIGS. 16 and 17 may be greater than the amplitudes A1, A2, and A3 of the first driving current Ids1, the second driving current Ids2, and the third driving current Ids3 of FIG. 11 by the ratio by which each of the first emission period EP1, the second emission period EP2, and the third emission period EP3 is shorter than the emission period EP of FIG. 11. For example, the emission period EP1, EP2, or EP3 and driving current Ids1, Ids2, or Ids3 of each subpixel SPX may be appropriately controlled so that each subpixel SPX can emit light at a target luminance in response to each gray level of video data DATA.

According to the above-described embodiments, the emission periods EP1, EP2, and EP3 of the first subpixel SPX1, the second subpixel SPX2, and the third subpixel SPX3 may be different from each other. For example, the start times and/or end times of the emission periods EP1 through EP3, which are most affected by signal interference between the first subpixel SPX1, the second subpixel SPX2, and the third subpixel SPX3, may be separated in time. Accordingly, the influence of the signal interference can be reduced, and a change in the driving current Ids and/or luminance of the subpixels SPX can be prevented or reduced.

A method of driving the display device 10 according to the above-described embodiments may include supplying data voltages respectively to subpixels SPX of each pixel PX in response to video data DATA and driving the subpixels SPX of each pixel PX in different emission periods EP1 through EP3. In one or more embodiments, the supplying of the data voltages respectively to the subpixels SPX and the driving of the subpixels SPX in different emission periods EP1 through EP3 may be sequentially performed during one driving cycle of a pixel PX including the subpixels SPX.

In one or more embodiments, the supplying of the data voltages respectively to the subpixels SPX of each pixel PX in response to the video data DATA may include supplying data voltages respectively to subpixels SPX included in a pixel PX of a horizontal line selected by a write scan signal input through each write scan line GWL. For example, a first data voltage, a second data voltage, and a third data voltage may be respectively supplied to a first subpixel SPX1, a second subpixel SPX2, and a third subpixel SPX3 through a first data line DL1, a second data line DL2, and a third data line DL3 of a pixel PX selected by a write scan signal.

In one or more embodiments, the driving of the subpixels SPX of each pixel PX in different emission periods EP1 through EP3 may include supplying a first emission control signal EMI1 to the first subpixel SPX1 during a first emission period EP1, supplying a second emission control signal EMI2 to the second subpixel SPX2 during a second emission period EP2, and supplying a third emission control signal EMI3 to the third subpixel SPX3 during a third emission period EP3. The first emission period EP1, the second emission period EP2, and the third emission period EP3 may belong to one driving cycle of each pixel PX and may be different from each other. For example, the first emission period EP1, the second emission period EP2, and the third emission period EP3 may not overlap each other in time. Alternatively, the first emission period EP1, the second emission period EP2, and the third emission period EP3 may partially overlap each other, but start times and/or end times of the first emission period EP1, the second emission period EP2, and the third emission period EP3 may be different from each other.

As described above, according to embodiments, the emission periods EP1, EP2, and EP3 of the first subpixel SPX1, the second subpixel SPX2, and the third subpixel SPX3 may be separated and set differently. For example, the emission periods EP1, EP2, and EP3 of the first subpixel SPX1, the second subpixel SPX2, and the third subpixel SPX3 may be completely separated from each other so that the first emission period EP1, the second emission period EP2, and the third emission period EP3 do not overlap each other as in the embodiments corresponding to FIGS. 13 through 15. Alternatively, as in the embodiments corresponding to FIGS. 16 through 18, the start times and/or end times (e.g., both the start and end times) of the emission periods EP1, EP2, and EP of the first subpixel SPX1, the second subpixel SPX2, and the third subpixel SPX3 may be separated in time.

According to embodiments, it is possible to prevent or reduce a change (e.g., a decrease) in the luminance of subpixels SPX due to signal interference that may occur between the subpixels SPX, and it is possible to substantially uniformly or appropriately secure the emission luminance of the subpixels SPX and a pixel PX including the subpixels SPX. Accordingly, the power consumption of the display device 10 can be improved, and the display quality of the display device 10 can be secured or improved.

Figure 19:
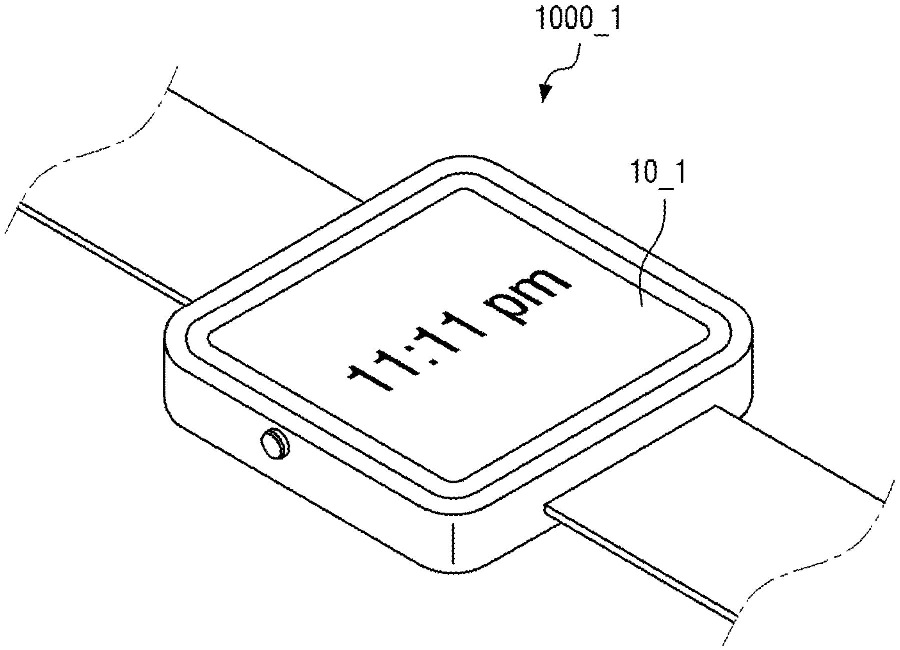
FIG. 19 is an example view of a smart watch including a display device according to one or more embodiments.

FIG. 19 is an example view of a smart watch including a display device according to one or more embodiments. Referring to FIG. 19, a display device 10_1 according to one or more embodiments may be applied to a smart watch 1000_1, which is one of smart devices.

Figure 20:
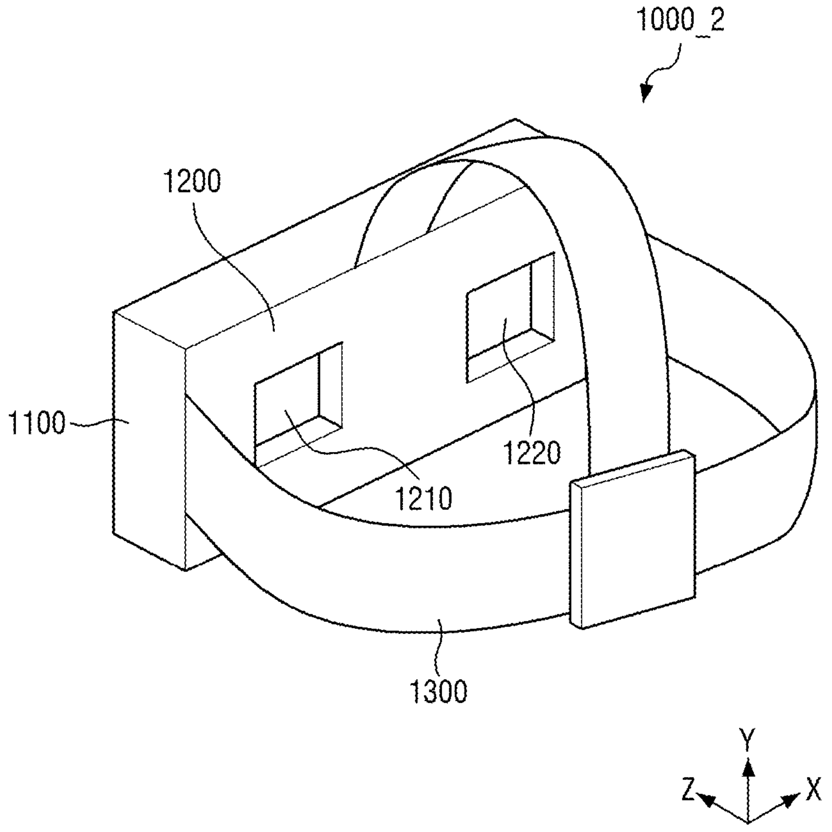
FIGS. 20 and 21 are example views of a virtual reality (VR) device including a display device according to one or more embodiments.
Figure 21:
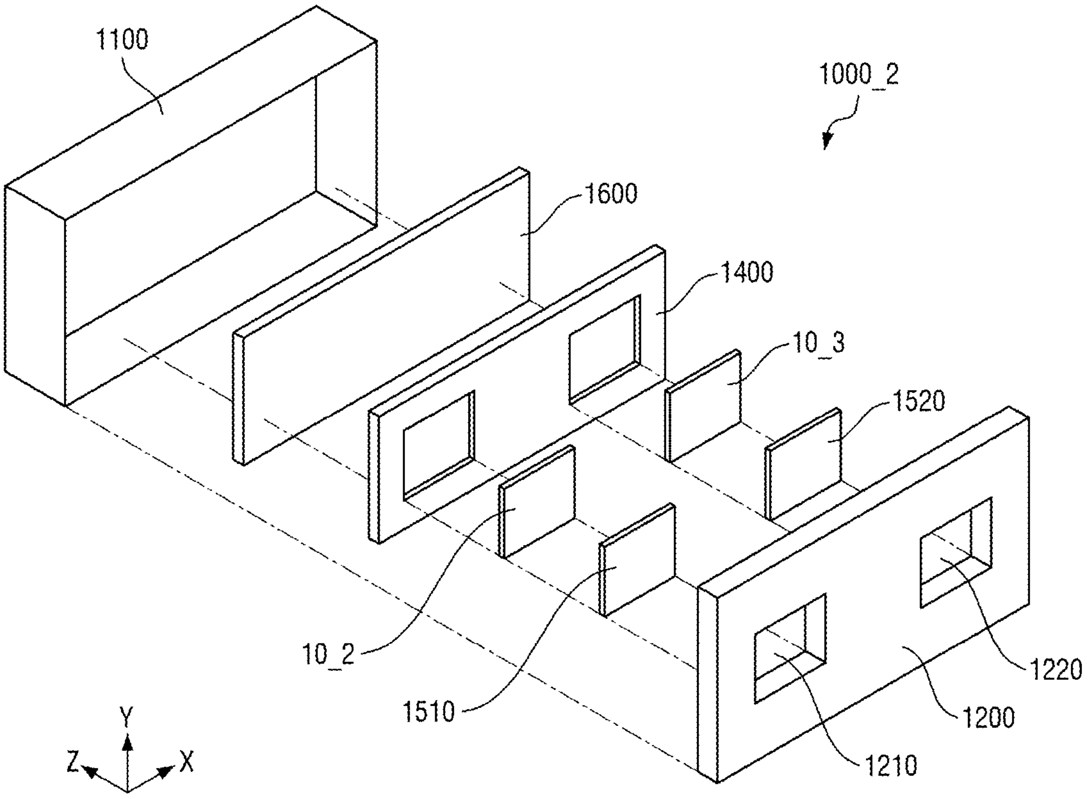

FIGS. 20 and 21 are example views of a virtual reality (VR) device including a display device according to one or more embodiments.

Referring to FIGS. 20 and 21, a head-mounted display device 1000_2 according to one or more embodiments includes a first display device 10_2, a second display device 10_3, a display device housing 1100, a housing cover 1200, a first eyepiece 1210, a second eyepiece 1220, a head-mounted band 1300, a middle frame 1400, a first optical member 1510, a second optical member 1520, and a control circuit board 1600.

The first display device 10_2 provides an image to a user's left eye, and the second display device 10_3 provides an image to the user's right eye. Each of the first display device 10_2 and the second display device 10_3 is substantially the same as the display device 10 described with reference to FIGS. 1 and 2. Therefore, a description of the first display device 10_2 and the second display device 10_3 will be omitted.

The first optical member 1510 may be located between the first display device 10_2 and the first eyepiece 1210. The second optical member 1520 may be located between the second display device 10_3 and the second eyepiece 1220. Each of the first optical member 1510 and the second optical member 1520 may include at least one convex lens.

The middle frame 1400 may be located between the first display device 10_2 and the control circuit board 1600, and may be located between the second display device 10_3 and the control circuit board 1600. The middle frame 1400 supports and fixes the first display device 10_2, the second display device 10_3, and the control circuit board 1600.

The control circuit board 1600 may be located between the middle frame 1400 and the display device housing 1100. The control circuit board 1600 may be connected to the first display device 10_2 and the second display device 10_3 through a connector. The control circuit board 1600 may convert an image source received from the outside into video data DATA, and may transmit the video data DATA to the first display device 10_2 and the second display device 10_3 through the connector.

The control circuit board 1600 may transmit the video data DATA corresponding to a left image optimized for a user's left eye to the first display device 10_2, and may transmit the video data DATA corresponding to a right image optimized for the user's right eye to the second display device 10_3. Alternatively, the control circuit board 1600 may transmit the same video data DATA to the first display device 10_2 and the second display device 10_3.

The display device housing 1100 houses the first display device 10_2, the second display device 10_3, the middle frame 1400, the first optical member 1510, the second optical member 1520, and the control circuit board 1600. The housing cover 1200 is placed to cover an open surface of the display device housing 1100. The housing cover 1200 may include the first eyepiece 1210 on which a user's left eye is placed, and the second eyepiece 1220 on which the user's right eye is placed. Although the first eyepiece 1210 and the second eyepiece 1220 are located separately in FIGS. 20 and 21, embodiments of the present specification are not limited thereto. The first eyepiece 1210 and the second eyepiece 1220 may also be combined into one.

The first eyepiece 1210 may be aligned with the first display device 10_2 and the first optical member 1510, and the second eyepiece 1220 may be aligned with the second display device 10_3 and the second optical member 1520. Therefore, a user can view an image of the first display device 10_2, which is enlarged as a virtual image by the first optical member 1510, through the first eyepiece 1210, and can view an image of the second display device 10_3, which is enlarged as a virtual image by the second optical member 1520, through the second eyepiece 1220.

The head-mounted band 1300 fixes the display device housing 1100 to a user's head so that the first eyepiece 1210 and the second eyepiece 1220 of the housing cover 1200 are kept placed on the user's left and right eyes, respectively. When the display device housing 1200 is implemented to be lightweight and small, the head-mounted display device 1000_2 may include an eyeglass frame as illustrated in FIG. 22 instead of the head-mounted band 1300.

In addition, the head-mounted display device 1000_2 may further include a battery for supplying power, an external memory slot for accommodating an external memory, and an external connection port and a wireless communication module for receiving an image source. The external connection port may be a universe serial bus (USB) terminal, a display port, or a high-definition multimedia interface (HDMI) terminal, and the wireless communication module may be a 5G communication module, a 4G communication module, a Wi-Fi® module, or a Bluetooth® module (Bluetooth® being a registered trademark of Bluetooth Sig, Inc., Kirkland, WA, and Wi-Fi® being a registered trademark of the non-profit Wi-Fi Alliance).

Figure 22:
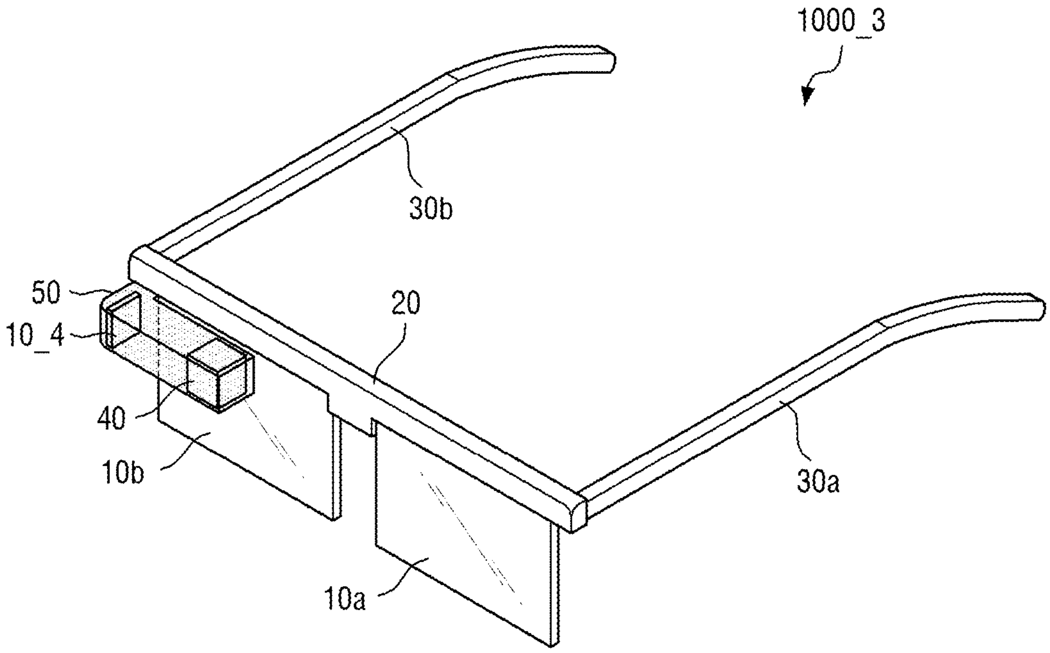
FIG. 22 is an example view of a VR device including a display device according to one or more embodiments.

FIG. 22 is an example view of a VR device including a display device according to one or more embodiments. FIG. 22 illustrates a VR device 1000_3 to which a display device 10_4 according to one or more embodiments has been applied.

Referring to FIG. 22, the VR device 1000_3 according to one or more embodiments may be a device in the form of glasses. The VR device 1000_3 according to one or more embodiments may include the display device 10_4, a left lens 10*a*, a right lens 10*b*, a support frame 20, eyeglass frame legs 30*a* and 30*b*, a reflective member 40, and a display device housing 50.

In FIG. 22, a case where the VR device 1000_3 is a glasses-type display device including the eyeglass frame legs 30*a* and 30*b* is illustrated as an example. That is, the VR device 1000_3 according to one or more embodiments is not limited to the one illustrated in FIG. 22 and can be applied in various forms to various other electronic devices.

The display device housing 50 may include the display device 10_4 and the reflective member 40. An image displayed on the display device 10_4 may be reflected by the reflective member 40, and may be provided to a user's right eye through the right lens 10*b*. Accordingly, the user may view a VR image displayed on the display device 10_4 through the right eye.

Although the display device housing 50 is located at a right end of the support frame 20 in FIG. 22, embodiments of the present specification are not limited thereto. For example, the display device housing 50 may also be located at a left end of the support frame 20. In this case, an image displayed on the display device 10_4 may be reflected by the reflective member 40, and may be provided to the user's left eye through the left lens 10*a*. Accordingly, the user may view a VR image displayed on the display device 10_4 through the left eye. Alternatively, the display device housing 50 may be located at both the right end and the left end of the support frame 20. In this case, the user may view a VR image displayed on the display device 10_4 through both the left eye and the right eye.

Figure 23:
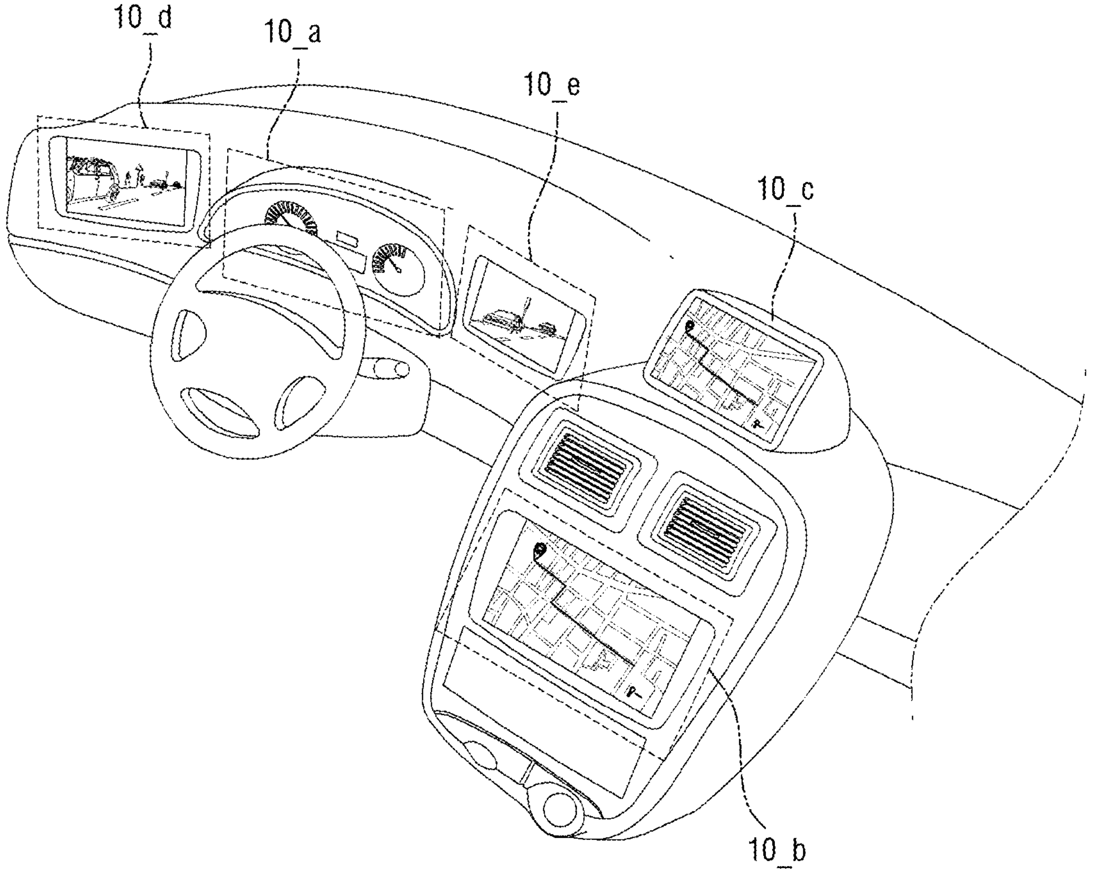
FIG. 23 is an example view illustrating a vehicle instrument cluster and center fascia including display devices according to one or more embodiments.

FIG. 23 is an example view illustrating a vehicle instrument cluster and center fascia including display devices according to one or more embodiments. FIG. 23 illustrates a vehicle to which display devices 10_*a* through 10_*e* according to one or more embodiments have been applied.

Referring to FIG. 23, the display devices 10_*a* through 10_*c* according to one or more embodiments may be applied to an instrument cluster of the vehicle, a center fascia of the vehicle, or a center information display (CID) located on a dashboard of the vehicle. In addition, the display devices 10_*d* and 10_*e* according to one or more embodiments may be applied to room mirror displays that replace side mirrors of the vehicle.

Figure 24:
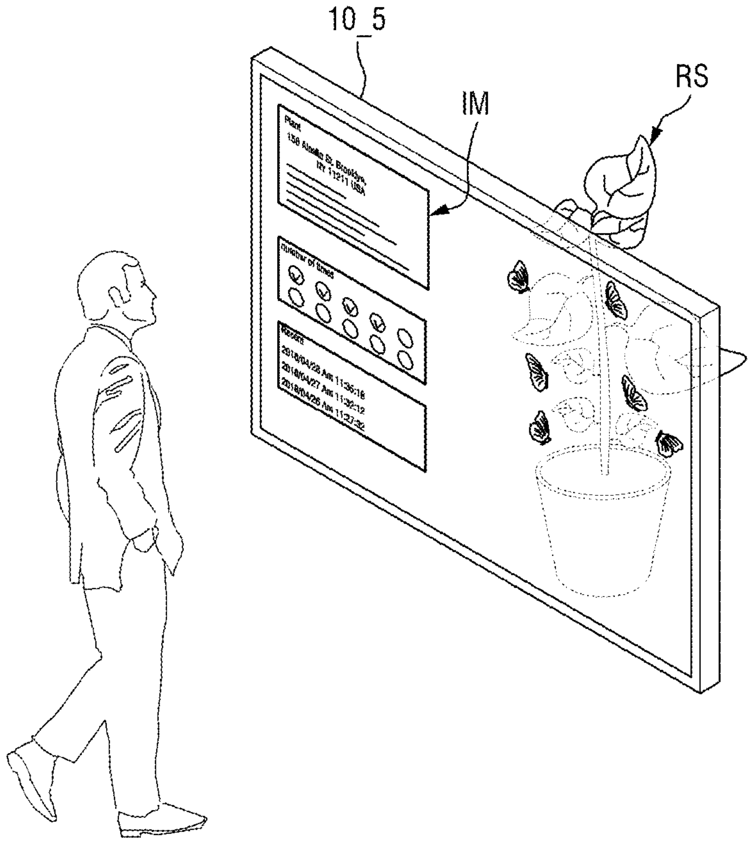
FIG. 24 is an example view of a transparent display device including a display device according to one or more embodiments.

FIG. 24 is an example view of a transparent display device including a display device according to one or more embodiments.

Referring to FIG. 24, a display device 10_5 according to one or more embodiments may be applied to a transparent display device. The transparent display device may transmit light while displaying an image IM. Therefore, a user located in front of the transparent display device cannot only view the image IM displayed on the display device 10_5, but also can view an object RS or the background located behind the transparent display device. When the display device 10_5 is applied to the transparent display device, a substrate of the display device 10_5 may include a light transmitting portion that can transmit light or may be made of a material that can transmit light.

In concluding the detailed description, those skilled in the art will appreciate that many variations and modifications can be made to the embodiments without substantially departing from the aspects of the present disclosure. Therefore, the disclosed embodiments of the present disclosure are used in a generic and descriptive sense only and not for purposes of limitation.

What is claimed is:

1. A display device comprising a pixel that comprises a first subpixel, a second subpixel, and a third subpixel respectively configured to emit light in response to a first driving current, a second driving current, and a third driving current during different first, second, and third emission periods, wherein the first emission period, the second emission period, and the third emission period each partially temporally overlap both of the others of the first, second, and third emission periods, have different start times, and have same temporal widths.

2. The display device of claim 1, wherein respective start times of the first emission period, the second emission period, and the third emission period are different.

3. The display device of claim 1, wherein respective end times of the first emission period, the second emission period, and the third emission period are different.

4. The display device of claim 1, wherein on-duty ratios of the first subpixel, the second subpixel, and the third subpixel are substantially equal.

5. The display device of claim 1, wherein an on-duty ratio of the first subpixel, the second subpixel, and the third subpixel is about ⅓ of an on-duty ratio of the pixel.

6. The display device of claim 1, further comprising:

a first emission control line connected to the first subpixel;

a second emission control line connected to the second subpixel; and a third emission control line connected to the third subpixel.

7. The display device of claim 6, further comprising a scan driver connected to the pixel, and comprising an emission control signal output unit configured to output a first emission control signal, a second emission control signal, and a third emission control signal to the first emission control line, the second emission control line, and the third emission control line, respectively.

8. The display device of claim 7, wherein the emission control signal output unit is configured to sequentially output the first emission control signal, the second emission control signal, and the third emission control signal during one driving cycle of the pixel.

9. The display device of claim 7, further comprising at least one scan line connected to the first subpixel, the second subpixel, and the third subpixel, wherein the scan driver further comprises at least one scan signal output unit configured to output a scan signal to the at least one scan line.

10. The display device of claim 6, wherein the first subpixel, the second subpixel, and the third subpixel are on a same horizontal line in a display area where the pixel is located, and wherein the first emission control line, the second emission control line, and the third emission control line are separated on the horizontal line.

11. The display device of claim 1, further comprising:

a first data line connected to the first subpixel;

a second data line connected to the second subpixel;

a third data line connected to the third subpixel; and a data driver configured to output a first data voltage, a second data voltage, and a third data voltage to the first data line, the second data line, and the third data line, respectively.

12. The display device of claim 11, wherein the first driving current, the second driving current, and the third driving current respectively have magnitudes corresponding to the first data voltage, the second data voltage, and the third data voltage.

13. The display device of claim 1, wherein the first subpixel comprises at least one light-emitting element for receiving the first driving current during the first emission period, wherein the second subpixel comprises at least one light-emitting element for receiving the second driving current during the second emission period, and wherein the third subpixel comprises at least one light-emitting element for receiving the third driving current during the third emission period.

14. A method of driving a display device that comprises a pixel comprising subpixels, the method comprising:

supplying data voltages respectively to the subpixels in response to video data; and driving the subpixels respectively in different emission periods comprising a first emission period, a second emission period, and a third emission period, wherein the first emission period, the second emission period, and the third emission period each partially temporally overlap both of the others of the first, second, and third emission periods, have different start times, and have same temporal widths.

15. The method of claim 14, wherein the subpixels comprises a first subpixel, a second subpixel, and a third subpixel, and wherein the driving of the subpixels in different emission periods comprises:

supplying a first emission control signal to the first subpixel during the first emission period;

supplying a second emission control signal to the second subpixel during the second emission period; and supplying a third emission control signal to the third subpixel during the third emission period.

16. The method of claim 15, wherein respective start times of the first emission period, the second emission period, and the third emission period are different, and wherein respective end times of the first emission period, the second emission period, and the third emission period are different.

17. An electronic device for providing an image, comprising:

a display device comprising a pixel that comprises a first subpixel, a second subpixel, and a third subpixel respectively configured to emit light in response to a first driving current, a second driving current, and a third driving current during different first, second, and third emission periods, wherein the first emission period, the second emission period, and the third emission period each partially overlap both of the others of the first, second, and third emission periods, have different start times, and have same temporal widths.

* * * * *